(12) United States Patent
Cha et al.

(10) Patent No.: US 12,484,389 B2
(45) Date of Patent: *Nov. 25, 2025

(54) DISPLAY DEVICE

(71) Applicant: Samsung Display Co., Ltd., Yongin-Si (KR)

(72) Inventors: Goeun Cha, Suwon-si (KR); Ilnam Kim, Hwaseongsi (KR); Kyungtea Park, Seoul (KR); Jonghyun Lee, Suwon-si (KR); Keumdong Jung, Seoul (KR); Kangbin Jo, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 956 days.

This patent is subject to a terminal disclaimer.

(21) Appl. No.: 17/671,826

(22) Filed: Feb. 15, 2022

(65) Prior Publication Data

US 2022/0336561 A1    Oct. 20, 2022

(30) Foreign Application Priority Data

Apr. 19, 2021    (KR) ........................ 10-2021-0050428

(51) Int. Cl.
*H10K 59/126*    (2023.01)
*G06V 40/13*    (2022.01)
(Continued)

(52) U.S. Cl.
CPC ....... *H10K 59/126* (2023.02); *G06V 40/1318* (2022.01); *G09G 3/3266* (2013.01);
(Continued)

(58) Field of Classification Search
CPC ............... H10K 59/126; H10K 59/353; H10K 59/131; H10K 59/60; H10K 59/65;
(Continued)

(56) References Cited

U.S. PATENT DOCUMENTS

| 10,275,094 | B2 | 4/2019 | Kim et al. |
| 10,727,285 | B2 | 7/2020 | Chung et al. |
| 10,957,749 | B2 | 3/2021 | Jung |
| 11,238,256 | B2 | 2/2022 | Ryu et al. |
| 11,727,874 | B2 * | 8/2023 | Cha ........................ H10K 65/00 345/690 |

(Continued)

FOREIGN PATENT DOCUMENTS

| CN | 111128874 A | 5/2020 |
| KR | 10-2018-0085097 A | 7/2018 |

(Continued)

OTHER PUBLICATIONS

WO Office Action Report, PCT Application No. PCT/KR2022/004739 dated Jun. 24, 2022, 3 pages.

*Primary Examiner* — Tom V Sheng
(74) *Attorney, Agent, or Firm* — Innovation Counsel LLP

(57) ABSTRACT

A display device may include a pixel and a sensor. The pixel may include an emission element and a pixel driving circuit. The pixel driving circuit may receive a first scan signal and a second scan signal. The sensor may include a light sensing element and a sensor driving circuit. The sensor driving circuit may include a reset transistor, an amplifying transistor, and an output transistor. The reset transistor may receive a reset voltage and the first scan signal and be connected to a first sensing node. The amplifying transistor may receive a first driving voltage and be connected between the first sensing node and a second sensing node. The output transistor may receive the second scan signals and be connected between the second sensing node and a readout line.

28 Claims, 14 Drawing Sheets

(51) Int. Cl.
*G09G 3/3266* (2016.01)
*H04N 25/00* (2023.01)
*H04N 25/47* (2023.01)
*H04N 25/76* (2023.01)
*H10K 59/131* (2023.01)
*H10K 59/35* (2023.01)
*H10K 59/60* (2023.01)
*H10K 59/65* (2023.01)

(52) U.S. Cl.
CPC ............ *H04N 25/00* (2023.01); *H04N 25/47* (2023.01); *H04N 25/76* (2023.01); *H10K 59/131* (2023.02); *H10K 59/353* (2023.02); *H10K 59/60* (2023.02); *H10K 59/65* (2023.02)

(58) Field of Classification Search
CPC ............ G06V 40/1318; G09G 3/3266; H04N 25/00; H04N 25/47; H04N 25/76
USPC .......................................................... 257/40
See application file for complete search history.

(56) References Cited

U.S. PATENT DOCUMENTS

| | | | |
|---|---|---|---|
| 11,862,100 B2* | 1/2024 | Jo | G09G 3/3241 |
| 2010/0091162 A1* | 4/2010 | Chuang | H04N 25/76 |
| | | | 348/308 |
| 2016/0132713 A1* | 5/2016 | Bae | H10K 59/65 |
| | | | 345/174 |
| 2018/0338098 A1* | 11/2018 | Stobie | H04N 25/67 |
| 2020/0311373 A1* | 10/2020 | Lee | G06V 40/1318 |
| 2020/0365099 A1 | 11/2020 | Lius et al. | |
| 2021/0066442 A1 | 3/2021 | Watanabe et al. | |
| 2021/0158751 A1 | 5/2021 | Cha et al. | |
| 2023/0336893 A1* | 10/2023 | Moue | H04N 25/75 |

FOREIGN PATENT DOCUMENTS

| KR | 10-2019-0015688 A | 2/2019 |
|---|---|---|
| KR | 10-2020-0015874 A | 2/2020 |
| KR | 10-2020-0076035 A | 6/2020 |
| KR | 10-2020-0115832 A | 10/2020 |
| KR | 10-2020-0142641 A | 12/2020 |
| KR | 10-2021-0064483 A | 6/2021 |

* cited by examiner

DISPLAY DEVICE

CROSS-REFERENCE TO RELATED APPLICATIONS

This U.S. non-provisional patent application claims priority under 35 U.S.C. § 119 to Korean Patent Application No. 10-2021-0050428, filed on Apr. 19, 2021, in the Korean Intellectual Property Office, the entire contents of which are hereby incorporated by reference.

BACKGROUND OF THE INVENTIVE CONCEPT

The present disclosure relates to a display device, and in particular, to a display device configured to recognize biometric information.

A display device enables communication between a user and an electronic device by providing various functions of displaying image information to a user or sensing an input from the user. In addition, recent display devices are configured to detect user's biometric information.

There are various biometric information recognition methods, such as a capacitance method of sensing a change in electrostatic capacitance between electrodes, an optical method of sensing an incident light using an optical sensor, and an ultrasonic method of sensing vibration using a piezo-electric device.

SUMMARY

An embodiment of the inventive concept provides a display device including a display panel, in which a sensor for biometric information recognition is provided.

According to an embodiment of the inventive concept, a display device may include a plurality of pixels and a plurality of sensors. Each of the pixels may include an emission element and a pixel driving circuit connected to the emission element. The pixel driving circuit may control an operation of the emission element in response to a first scan signal and a second scan signal. Each of the sensors may include a light sensing element and a sensor driving circuit connected to the light sensing element. The sensor driving circuit may output a sensing signal in response to the first scan signal and the second scan signal.

In an embodiment, the sensor driving circuit may include a reset transistor, an amplifying transistor, and an output transistor. The reset transistor may include a first electrode receiving a reset voltage, a second electrode connected to a first sensing node, and a third electrode receiving the first scan signal. The amplifying transistor may include a first electrode receiving a first driving voltage, a second electrode connected to a second sensing node, and a third electrode connected to the first sensing node. The output transistor may include a first electrode connected to the second sensing node, a second electrode connected to a readout line, and a third electrode receiving the second scan signal.

According to an embodiment of the inventive concept, a display device may include a plurality of pixels and a plurality of sensors. Each of the pixels may include an emission element and a pixel driving circuit connected to the emission element. The pixel driving circuit may control an operation of the emission element in response to a first scan signal and a second scan signal. Each of the sensors may include a light sensing element and a sensor driving circuit connected to the light sensing element. The sensor driving circuit may output a sensing signal in response to the first scan signal and the second scan signal.

In an embodiment, the pixel driving circuit may include a first transistor which is connected between a first driving voltage line receiving a first driving voltage and the emission element, a second transistor which is connected between a data line and a first electrode of the first transistor and receives a third scan signal, a third transistor which is connected between a second electrode of the first transistor and a first node and receives a first scan signal, and a fourth transistor which is connected between the first node and an initializing line and receives a second scan signal.

The sensor driving circuit may include a reset transistor, an amplifying transistor, and an output transistor. The reset transistor may include a first electrode receiving the third scan signal, a second electrode connected to a first sensing node, and a third electrode receiving the first scan signal. The amplifying transistor may include a first electrode connected to the first driving voltage line, a second electrode connected to a second sensing node, and a third electrode connected to the first sensing node. The output transistor may include a first electrode connected to the second sensing node, a second electrode connected to a sensing line, and a third electrode receiving the second scan signal.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
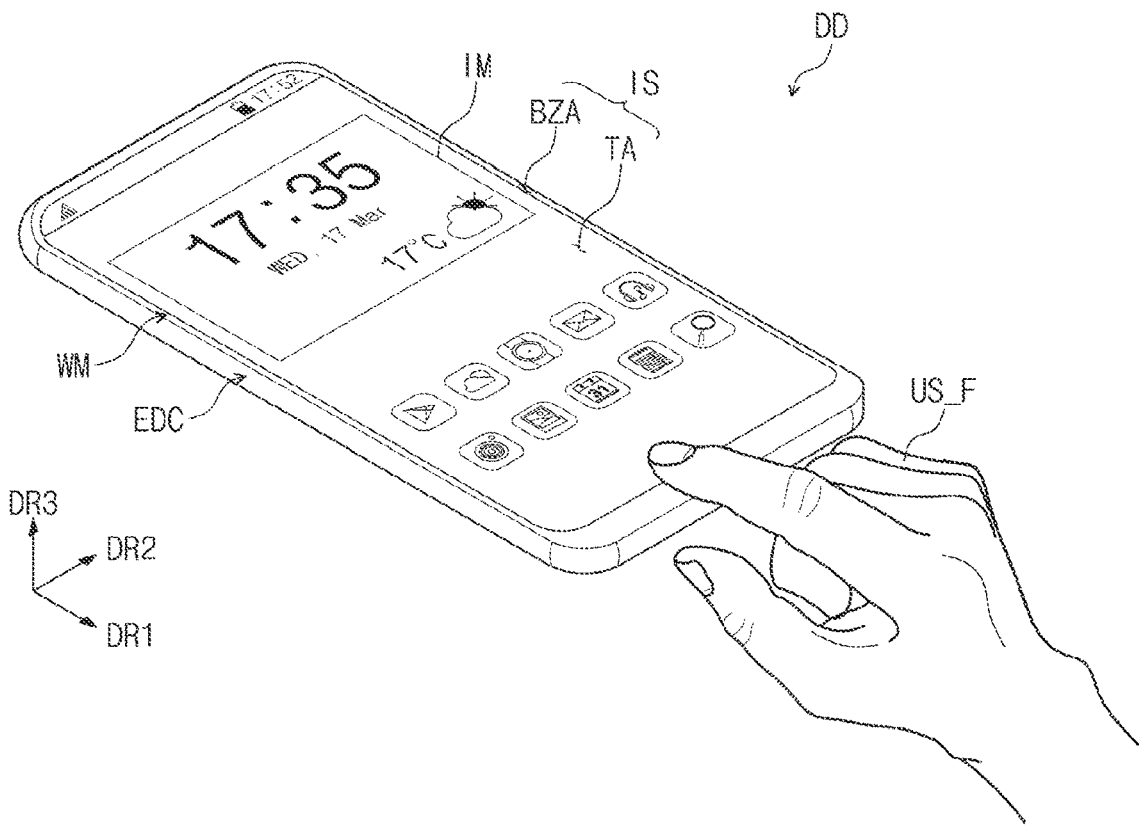
FIG. 1 is a perspective view illustrating a display device according to an embodiment of the inventive concept.

It should be noted that these figures are intended to illustrate the general characteristics of methods, structure and/or materials utilized in certain example embodiments and to supplement the written description provided below.

These drawings may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
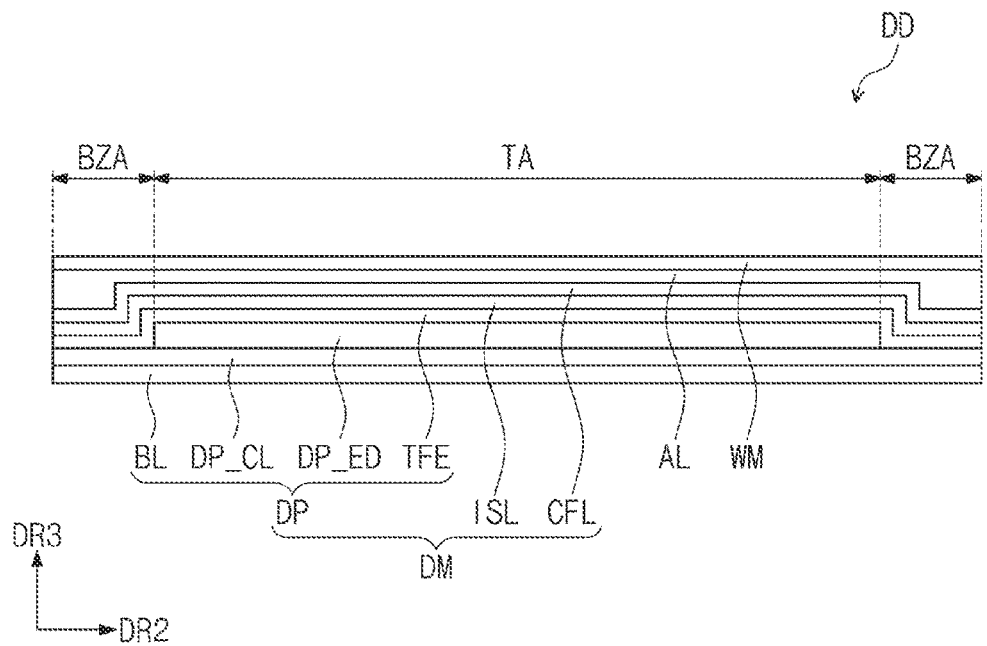
FIG. 2 is a sectional view illustrating a display device according to an embodiment of the inventive concept.

FIG. 1 is a perspective view illustrating a display device according to an embodiment of the inventive concept, and FIG. 2 is a sectional view illustrating a display device according to an embodiment of the inventive concept.

Referring to FIGS. 1 and 2, a display device DD according to an embodiment of the inventive concept may have a rectangular shape whose long sides are parallel to a first direction DR1 and whose short sides are parallel to a second direction DR2 crossing the first direction DR1. However, the inventive concept is not limited to this example, and in an embodiment, the display device DD may have various shapes such as circular and polygonal shapes.

The display device DD may be a device that is activated by an electrical signal applied thereto. The display device DD may be realized in various forms. For example, the display device DD may be used for various electronic devices such as smart watches, tablets, laptop computers, computers, and smart television sets.

Hereinafter, a direction, which is perpendicular or normal to a plane defined by both of the first and second directions DR1 and DR2, will be referred to as a third direction DR3. Furthermore, in the present specification, the expression "when viewed in a plan view" may mean that a relevant structure is seen in the third direction DR3.

A top surface of the display device DD may be defined as a display surface IS and may have a plane defined by the first and second directions DR1 and DR2. Images IM, which are produced by the display device DD, may be provided to a user through the display surface IS.

The display surface IS may include a transmission region TA and a bezel region BZA. The transmission region TA may be a region on which the images IM are displayed. A user may recognize the images IM through the transmission region TA. In the present embodiment, the transmission region TA is illustrated to have a rectangular shape with rounded corners. However, the inventive concept is not limited to this example, and, in an embodiment, the shape of the transmission region TA may be variously changed.

The bezel region BZA may be disposed adjacent to the transmission region TA. The bezel region BZA may have a predetermined color. The bezel region BZA may be provided to enclose the transmission region TA. Thus, the shape of the transmission region TA may be substantially defined by the bezel region BZA. However, the inventive concept is not limited to this example, and, in an embodiment, the bezel region BZA may be provided near one of sides of the transmission region TA or may be omitted.

The display device DD may sense an external input provided from the outside. The external input may include various types of input signals which are provided from the outside of the display device DD. For example, the external input may include a touching-type external input such as a user's hand US_F, and a non-touching-type external input such as a reduction of a distance to the display device DD or a hovering event near the display device DD. In addition, the external input may be provided in various forms such as force, pressure, temperature, and light.

The display device DD may sense a user's biometric information which is provided from the outside. A biometric information sensing region which can sense the user's biometric information may be provided on the display surface IS of the display device DD. The biometric information sensing region may be provided throughout the transmission region TA or may be provided in a portion of the transmission region TA. FIG. 1 illustrates an example in which the entirety of the transmission region TA is used as the biometric information sensing region, but the inventive concept is not limited to this example; that is, the biometric information sensing region may be locally provided in a portion of the transmission region TA.

The display device DD may include a window WM, a display module DM, and a housing EDC. In the present embodiment, the window WM and the housing EDC may be combined to each other to define an outer appearance of the display device DD.

A front surface of the window WM may define the display surface IS of the display device DD. The window WM may be formed of or include an optically transparent insulating material. For example, the window WM may be formed of or include glass or plastic materials. The window WM may have a multi-layered or single-layered structure. For example, the window WM may include a plurality of plastic films which are combined to each other by an adhesive material, or a glass substrate and a plastic film which are combined to each other by an adhesive material.

The display module DM may include a display panel DP and an input-sensing layer ISL. The display panel DP may be configured to display an image in response to an electrical signal applied thereto and the input-sensing layer ISL may sense an external input provided from the outside. The external input may be provided in various forms.

In an embodiment, the display panel DP may be a light-emitting type display panel, but the inventive concept is not limited to a specific type of the display panel DP. For example, the display panel DP may be an organic light-emitting display panel, an inorganic light-emitting display panel, or a quantum dot light-emitting display panel. An emission layer of the organic light emitting display panel may be formed of or include an organic light emitting material and an emission layer of the inorganic light-emitting display panel may be formed of or include an inorganic light-emitting material. An emission layer of the quantum dot light-emitting display panel may include quantum dots and/or quantum rods. For the sake of simplicity, the description that follows will refer to an example in which the display panel DP is the organic light-emitting display panel.

Referring to FIG. 2, the display panel DP may include a base layer BL, a circuit layer DP_CL, a display element layer DP_ED, and an encapsulation layer TFE. In an embodiment, the display panel DP may be a flexible display panel. However, the inventive concept is not limited thereto. For example, the display panel DP may be a foldable display panel which can be folded along a folding axis or a rigid display panel.

The base layer BL may include a synthetic resin layer. The synthetic resin layer may be a polyimide-based resin layer, however the inventive concept is not limited to a specific material to be used for the base layer BL. In addition, the base layer BL may include a glass substrate, a metal substrate, or an organic/inorganic composite substrate.

The circuit layer DP_CL may be disposed on the base layer BL. The circuit layer DP_CL may include at least one insulating layer and at least one circuit element. Hereinafter, the insulating layer in the circuit layer DP_CL will be referred to as an intermediate insulating layer. The intermediate insulating layer may include at least one intermediate inorganic layer and at least one intermediate organic layer. The circuit element may include a pixel driving circuit which is included in each of pixels for displaying an image, and a sensor driving circuit which is included in each of sensors for recognizing external information. The external information may be a user's biometric information. In an embodiment, the sensor may be a fingerprint recognition sensor, a proximity sensor, an iris recognition sensor, or the like. In addition, the sensor may be an optical sensor which is configured to recognize the biometric information in an optical manner. The circuit layer DP_CL may further include signal lines that are connected to the pixel driving circuit and the sensor driving circuit.

The display element layer DP_ED may include an emission element which is included in each of the pixels and a light sensing element which is included in each of the sensors. In an embodiment, the light sensing element may be a photodiode. An optical-type fingerprint sensor may be configured to sense light reflected by a user's fingerprint. The circuit layer DP_CL and the display element layer DP_ED will be described in more detail with reference to FIGS. 12, 13A, and 13B.

The encapsulation layer TFE may be provided to hermetically seal or encapsulate the display element layer DP_ED. The encapsulation layer TFE may include at least one organic layer and at least one inorganic layer. The inorganic layer may be formed of or include an inorganic material and may protect the display element layer DP_ED from moisture or oxygen. The inorganic layer may include a silicon nitride layer, a silicon oxynitride layer, a silicon oxide layer, a titanium oxide layer, an aluminum oxide layer, or the like but the inventive concept is not limited to these examples. The organic layer may be formed of or include an organic material and may protect the display element layer DP_ED from contaminants such as dust particles.

The input-sensing layer ISL may be formed on the display panel DP. The input-sensing layer ISL may be directly disposed on the encapsulation layer TFE. In an embodiment, the input-sensing layer ISL may be formed on the display panel DP through successive processes. That is, in the case where the input-sensing layer ISL is directly disposed on the display panel DP, any adhesive film may not be disposed between the input-sensing layer ISL and the encapsulation layer TFE. However, in an embodiment, an internal adhesive film may be disposed between the input-sensing layer ISL and the display panel DP. In this case, the input-sensing layer ISL and the display panel DP may not be fabricated in a successive manner, and the input-sensing layer ISL may be fabricated by a process which is different form a process for the display panel DP and may be attached to a top surface of the display panel DP by the internal adhesive film.

The input-sensing layer ISL may sense an external input (e.g., a touch event from a user), may convert the sensed external input to an input signal, and may provide the input signal to the display panel DP. The input-sensing layer ISL may include a plurality of sensing electrodes which are used to sense the external input. The sensing electrodes may sense the external input in a capacitive manner. The display panel DP may receive an input signal from the input-sensing layer ISL and may generate an image corresponding to the input signal.

The display module DM may further include a color filter layer CFL. In an embodiment, the color filter layer CFL may be disposed on the input-sensing layer ISL. But the inventive concept is not limited to this example. The color filter layer CFL may be disposed between the display panel DP and the input-sensing layer ISL. The color filter layer CFL may include a plurality of color filters and a black matrix.

The structure of the input-sensing layer ISL and the color filter layer CFL will be described in more detail below.

In an embodiment, the display device DD may further include an adhesive layer AL. The window WM may be attached to the input-sensing layer ISL by the adhesive layer AL. The adhesive layer AL may be formed of or include an optical clear adhesive, an optical clear adhesive resin, or a pressure sensitive adhesive (PSA).

The housing EDC may be combined to the window WM. An internal space may be defined by the housing EDC and the window WM that are combined to each other. The display module DM may be disposed in the internal space. The housing EDC may be formed of or include a material having a relatively high stiffness or strength. For example, the housing EDC may include at least one of glass, plastic, or metallic materials or may include a plurality of frames and/or plates that are made of the glass, plastic, or metallic materials. The housing EDC may stably protect elements of the display device DD which are disposed in the internal space from an external impact. Although not shown, a battery module which supplies an electric power for operations of the display device DD may be disposed between the display module DM and the housing EDC.

Figure 3:
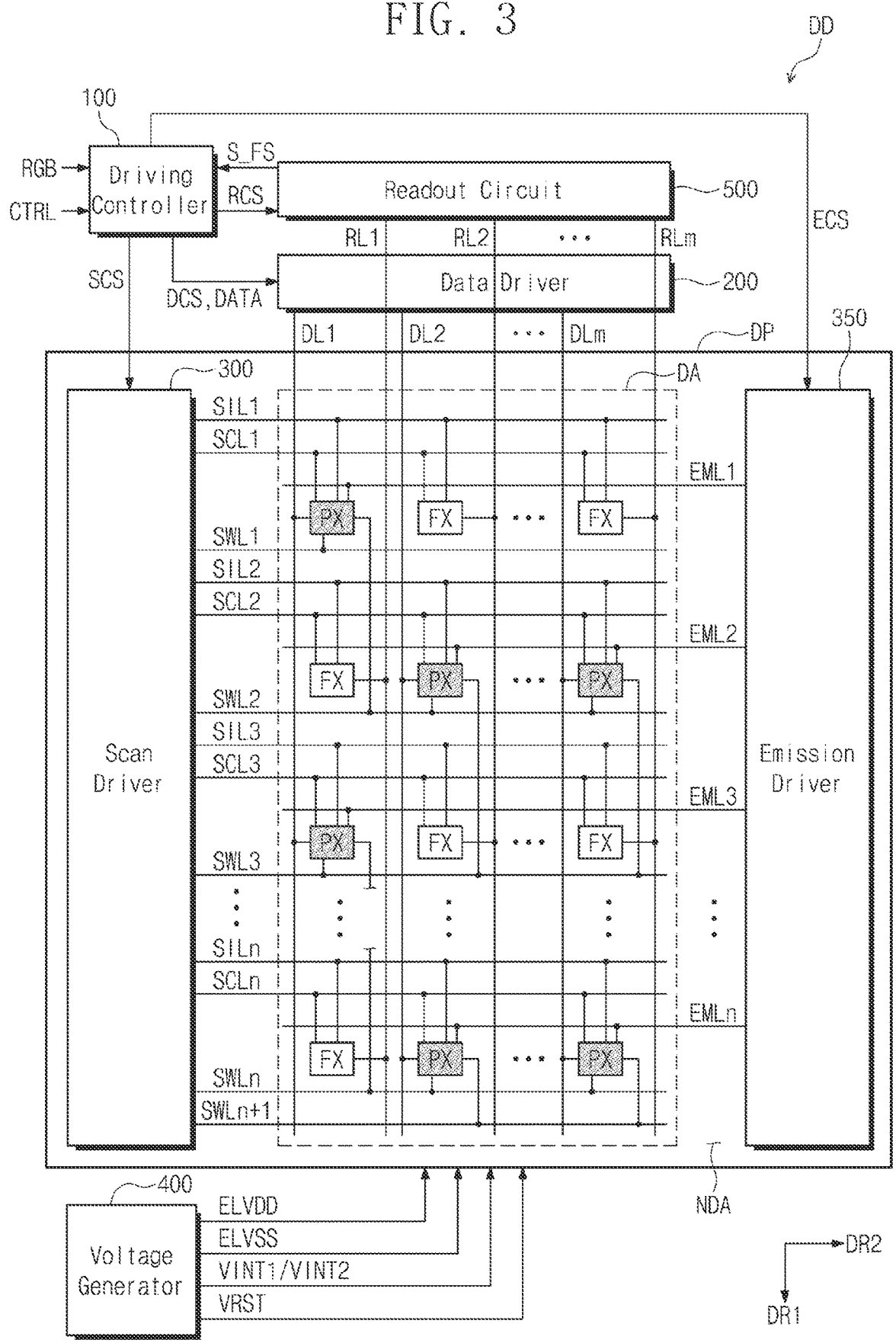
FIG. 3 is a block diagram illustrating a display device according to an embodiment of the inventive concept.
Figure 4A:
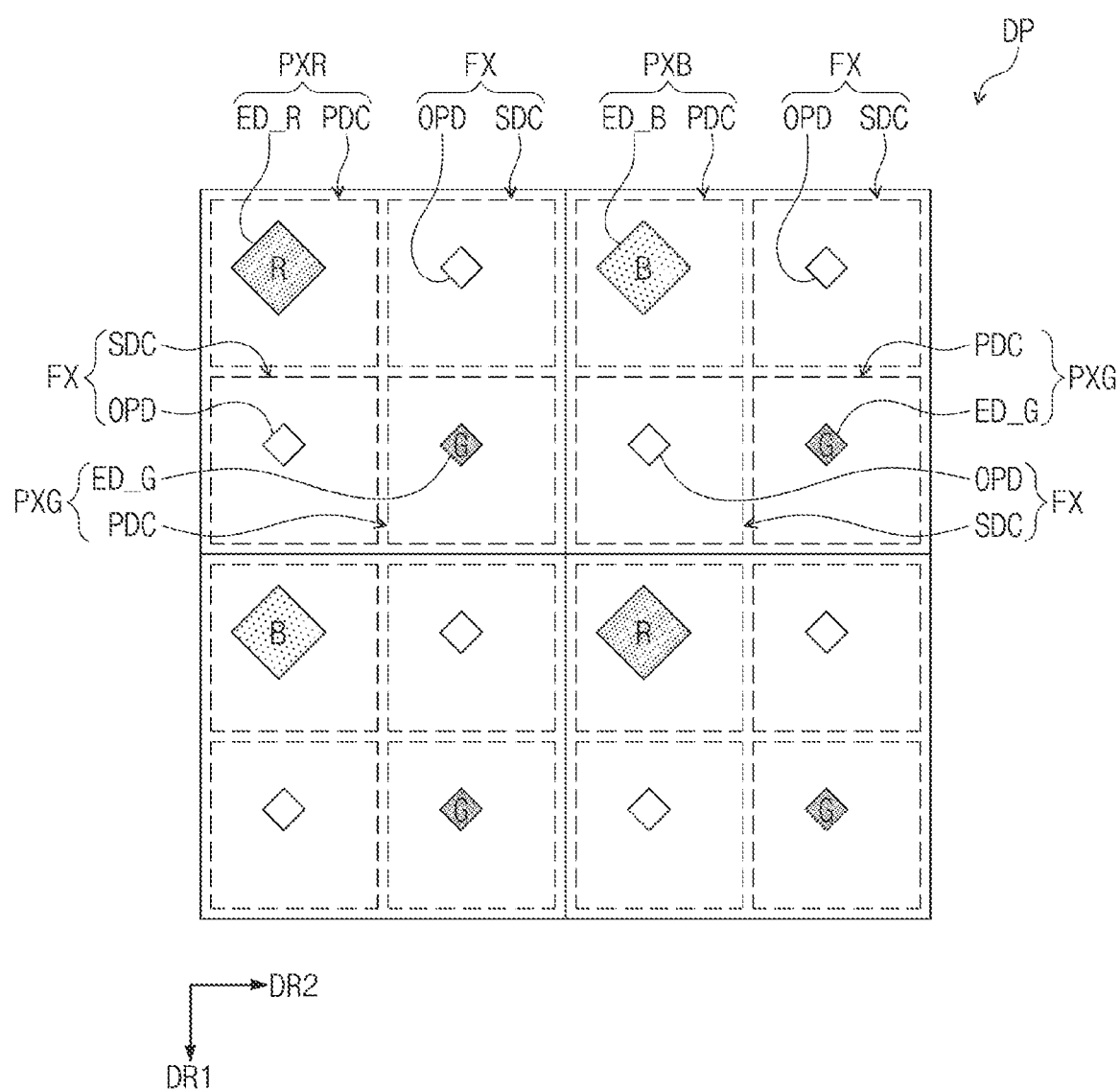
FIGS. 4A and 4B are enlarged plan views illustrating a region of a display panel according to an embodiment of the inventive concepts.
Figure 4B:
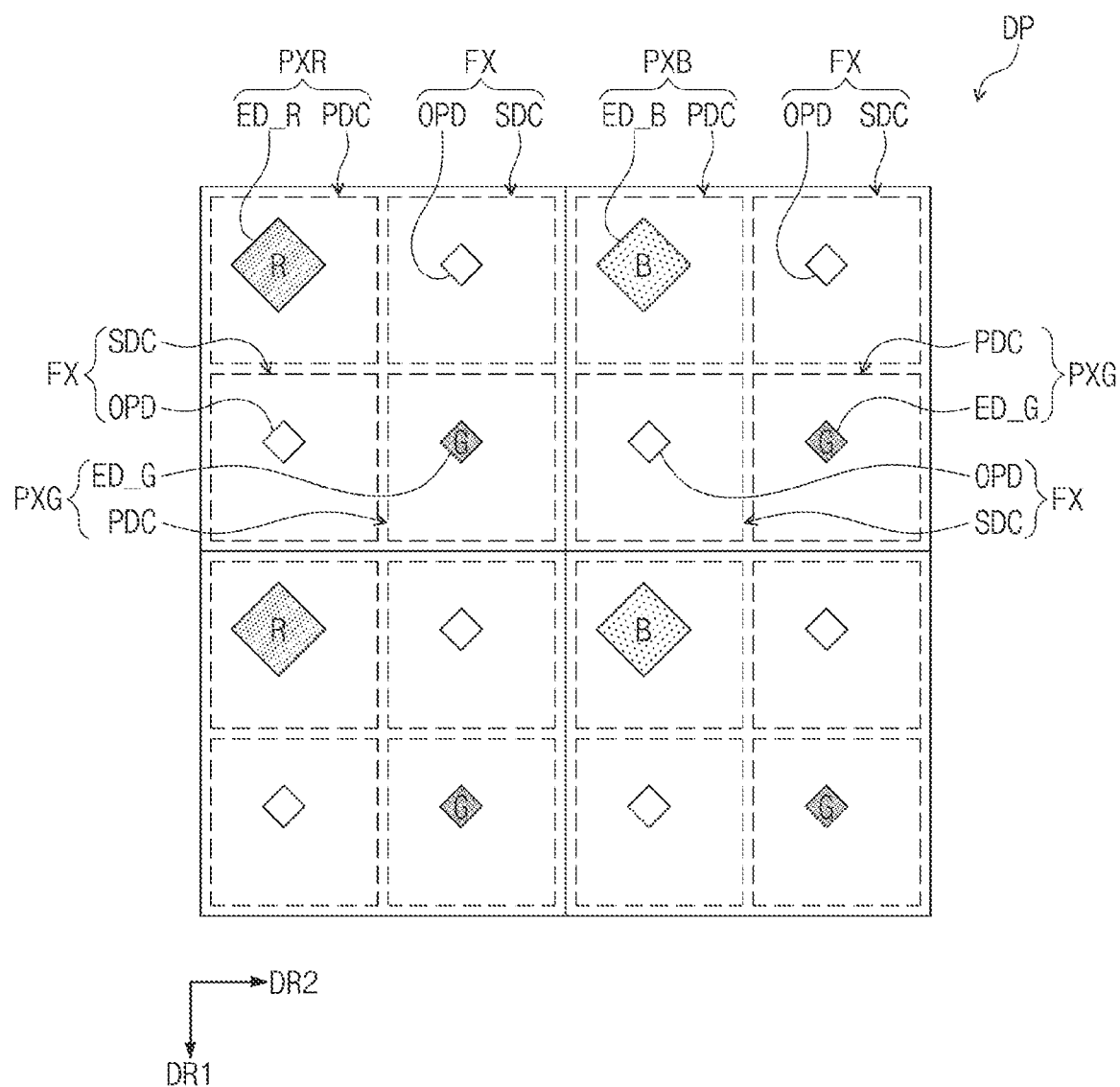

FIG. 3 is a block diagram illustrating a display device according to an embodiment of the inventive concept, and FIGS. 4A and 4B are enlarged plan views illustrating a region of a display panel according to an embodiment of the inventive concepts.

Referring to FIG. 3, the display device DD may include the display panel DP, a panel driver, and a driving controller 100. In an embodiment, the panel driver may include a data driver 200, a scan driver 300, an emission driver 350, a voltage generator 400, and a readout circuit 500.

The driving controller 100 may receive an image signal RGB and a control signal CTRL. The driving controller 100 may convert a data format of the image signal RGB to an image data signal DATA which is suitable for the interface specification with the data driver 200. The driving controller 100 may output a first control signal SCS, a second control signal ECS, a third control signal DCS, and a fourth control signal RCS.

The data driver 200 may receive the third control signal DCS and the image data signal DATA from the driving controller 100. The data driver 200 may convert the image data signal DATA to data signals and may output the data signals to a plurality of data lines DL1 to DLm, which will be described below. The data signals may be analog voltages corresponding to a gradation value of the image data signal DATA.

The scan driver 300 may receive the first control signal SCS from the driving controller 100. The scan driver 300 may output scan signals to scan lines in response to the first control signal SCS.

The voltage generator 400 may generate various voltages which are used to operate the display panel DP. In the present embodiment, the voltage generator 400 may generate a first driving voltage ELVDD, a second driving voltage ELVSS, a first initializing voltage VINT1, a second initializing voltage VINT2, and a reset voltage VRST.

The display panel DP may include a display region DA disposed corresponding to the transmission region TA of FIG. 1 and a non-display region NDA disposed corresponding to the bezel region BZA of FIG. 1.

The display panel DP may include a plurality of pixels PX which are disposed in the display region DA and a plurality of sensors FX which are disposed in the display region DA. In an embodiment, each of the sensors FX may be disposed between adjacent two pixels of the pixels PX. The pixels PX and the sensors FX may be alternately disposed in the first and second directions DR1 and DR2.

The display panel DP may further include initializing scan lines SIL1 to SILn, compensating scan lines SCL1 to SCLn, writing scan lines SWL1 to SWLn+1, emission control lines EML1 to EMLn, data lines DL1 to DLm, and readout lines RL1 to RLm. The initializing scan lines SIL1 to SILn, the compensating scan lines SCL1 to SCLn, the writing scan lines SWL1 to SWLn+1, and the emission control lines EML1 to EMLn may extend in the second direction DR2. The initializing scan lines SIL1 to SILn, the compensating scan lines SCL1 to SCLn, the writing scan lines SWL1 to SWLn+1, and the emission control lines EML1 to EMLn may be arranged to be spaced apart from each other in the first direction DR1. The data lines DL1 to DLm and the readout lines RL1 to RLm may extend in the first direction DR1 and may be arranged to be spaced apart from each other in the second direction DR2.

The pixels PX may be electrically connected to the initializing scan lines SIL1 to SILn, the compensating scan lines SCL1 to SCLn, the writing scan lines SWL1 to SWLn+1, the emission control lines EML1 to EMLn, and the data lines DL1 to DLm, respectively. Each of the pixels PX may be electrically connected to four scan lines. For example, as shown in FIG. 3, the pixels PX in a first row may be connected to a first initializing scan line SILL a first compensating scan line SCL1, and first and second writing scan lines SWL1 and SWL2. In addition, the pixels PX in a second row may be connected to a second initializing scan line SIL2, a second compensating scan line SCL2, and second and third writing scan lines SWL2 and SWL3.

The sensors FX may be electrically connected to the initializing scan lines SIL1 to SILn, the compensating scan lines SCL1 to SCLn and the readout lines RL1 to RLm, respectively. Each of the sensors FX may be electrically connected to two scan lines. For example, as shown in FIG. 3, the sensors FX in the first row may be connected to the first initializing scan line SIL1 and the first compensating scan line SCL1. In addition, the sensors FX in the second row may be connected to the second initializing scan line SIL2 and the second compensating scan line SCL2.

The scan driver 300 may be disposed in the non-display region NDA of the display panel DP. The scan driver 300 may receive the first control signal SCS from the driving controller 100. The first control signal SCS may include a start signal and a plurality of clock signals. The scan driver 300 may output initializing scan signals to the initializing scan lines SIL1 to SILn, output compensating scan signals to the compensating scan lines SCL1 to SCLn, and output writing scan signals to the writing scan lines SWL1 to SWLn+1, in response to the first control signal SCS.

The emission driver 350 may be disposed in the non-display region NDA of the display panel DP. The emission driver 350 may receive the second control signal ECS from the driving controller 100. The emission driver 350 may output emission control signals to the emission control lines EML1 to EMLn in response to the second control signal ECS. Alternatively, the scan driver 300 may be connected to the emission control lines EML1 to EMLn. In this case, the scan driver 300 may output the emission control signals to the emission control lines EML1 to EMLn and the emission driver 350 may be omitted.

The readout circuit 500 may receive the fourth control signal RCS from the driving controller 100. The readout circuit 500 may receive sensing signals from the readout lines RL1 to RLm in response to the fourth control signal RCS. The readout circuit 500 may process the sensing signals received from the readout lines RL1 to RLm and may provide the processed sensing signals S_FS to the driving controller 100. The driving controller 100 may recognize biometric information based on the sensing signals S_FS.

As shown in FIGS. 4A and 4B, the display panel DP may include pixels PXR, PXG, and PXB and the sensors FX. Each of the pixels PXR, PXG, and PXB may include emission elements ED_R, ED_G, and ED_B and a pixel driving circuit PDC. Each of the sensors FX may include a light sensing element OPD and a sensor driving circuit SDC.

The pixels PXR, PXG, and PXB and the sensors FX may be alternately disposed in the first direction DR1 and may be alternately disposed in the second direction DR2. The pixels PXR, PXG, and PXB may include first pixels PXR which include an emission element (hereinafter, a first emission element ED_R) emitting a light of first color (e.g., red (R)), second pixels PXG which include an emission element (hereinafter, a second emission element ED_G) emitting a light of second color (e.g., green (G)), and third pixels PXB which include an emission element (hereinafter, a third emission element ED_B) emitting a light of third color (e.g., blue (B)).

As shown in FIG. 4A, the first pixels PXR and the third pixels PXB may be alternately and repeatedly disposed in the first and second directions DR1 and DR2. The second pixels PXG may be arranged in the first and second directions DR1 and DR2.

In the first and second directions DR1 and DR2, each of the sensors FX may be disposed between the first pixel PXR and the third pixel PXB which are adjacent to each other. Furthermore, in the first and second directions DR1 and DR2, the sensors FX and the second pixels PXG may be alternately disposed. However, the arrangement structures of the pixels PX and the sensors FX are not limited to this example.

As shown in FIG. 4B, in the first direction DR1, each of the sensors FX may be disposed between two first pixels of the first pixels PXR, between two second pixels of the second pixels PXG, and between two third pixels of the third pixels PXB. Furthermore, each of the sensors FX may be disposed between the first pixel PXR and the third pixel PXB which are disposed adjacent to each other in the second direction DR2 and between two second pixels of the second pixels PXG which are disposed adjacent to each other in the second direction DR2. In addition, the arrangement structures of the pixels PX and the sensors FX may be variously changed.

For example, the first pixels PXR and the third pixels PXB may be disposed in different columns or in different rows. If the first pixels PXR are disposed in odd-numbered columns, the third pixels PXB may be disposed in even-numbered columns. If the first pixels PXR may be disposed in odd-numbered rows, the third pixels PXB may be disposed in even-numbered rows. In this case, at least one second pixel PXG and at least one sensor FX may be disposed between two first pixels of the first pixels PXR which are disposed adjacent to each other in the first and second directions DR1 and DR2. In addition, at least one second pixel PXG and at least one sensor FX may be disposed between two third pixels of the third pixels PXB which are disposed adjacent to each other in the first and second directions DR1 and DR2.

In an embodiment, the first emission element ED_R may have a size larger than the second emission element ED_G. In addition, the third emission element ED_B may have a size larger than or equal to the first emission element ED_R. The size of each of the first to third emission elements ED_R, ED_G, and ED_B is not limited thereto and may be changed in various manners. For example, in an embodiment, the first to third emission elements ED_R, ED_G, and ED_B may have the same size as each other.

In addition, each of the first to third emission elements ED_R, ED_G, and ED_B is illustrated to have a rectangular shape, but the inventive concept is not limited to this example. For example, the shape of each of the first to third emission elements ED_R, ED_G, and ED_B may have various shapes (e.g., polygonal, circular, and elliptical shapes). In an embodiment, the first to third emission elements ED_R, ED_G, and ED_B may have different shapes from each other. For example, the second emission element ED_G may have a circular shape, and the first and third emission elements ED_R and ED_B may have a rectangular shape.

The light sensing element OPD may have a size that is smaller than the first and third emission elements ED_R and ED_B. In an embodiment, the light sensing element OPD may have a size that is smaller than or equal to the second emission element ED_G. However, the size of the light sensing element OPD is not limited to this example and may be variously changed. The light sensing element OPD is illustrated to have a rectangular shape, but the inventive concept is not limited to this example. For example, the shape of the light sensing element OPD may be variously changed to one of polygonal, circular, and elliptical shapes.

Each of the first to third emission elements ED_R, ED_G, and ED_B may be electrically connected to a corresponding one of the pixel driving circuits PDC. The pixel driving circuit PDC may include a plurality of transistors and at least one capacitor. The pixel driving circuits PDC which are respectively connected to the first to third emission elements ED_R, ED_G, and ED_B, may have the same circuit structure.

The light sensing element OPD may be electrically connected to the sensor driving circuit SDC. The sensor driving circuit SDC may include a plurality of transistors. In an embodiment, the sensor driving circuit SDC and the pixel driving circuit PDC may be formed at the same time through the same process. In addition, the scan driver 300 may include transistors which are formed by the same process as the pixel driving circuit PDC and the sensor driving circuit SDC.

The pixel driving circuit PDC may receive the first driving voltage ELVDD, the second driving voltage ELVSS, the first and second initializing voltages VINT1 and VINT2 from the voltage generator 400. The sensor driving circuit SDC may receive the first driving voltage ELVDD, the second driving voltage ELVSS, and the reset voltage VRST from the voltage generator 400.

Figure 5:
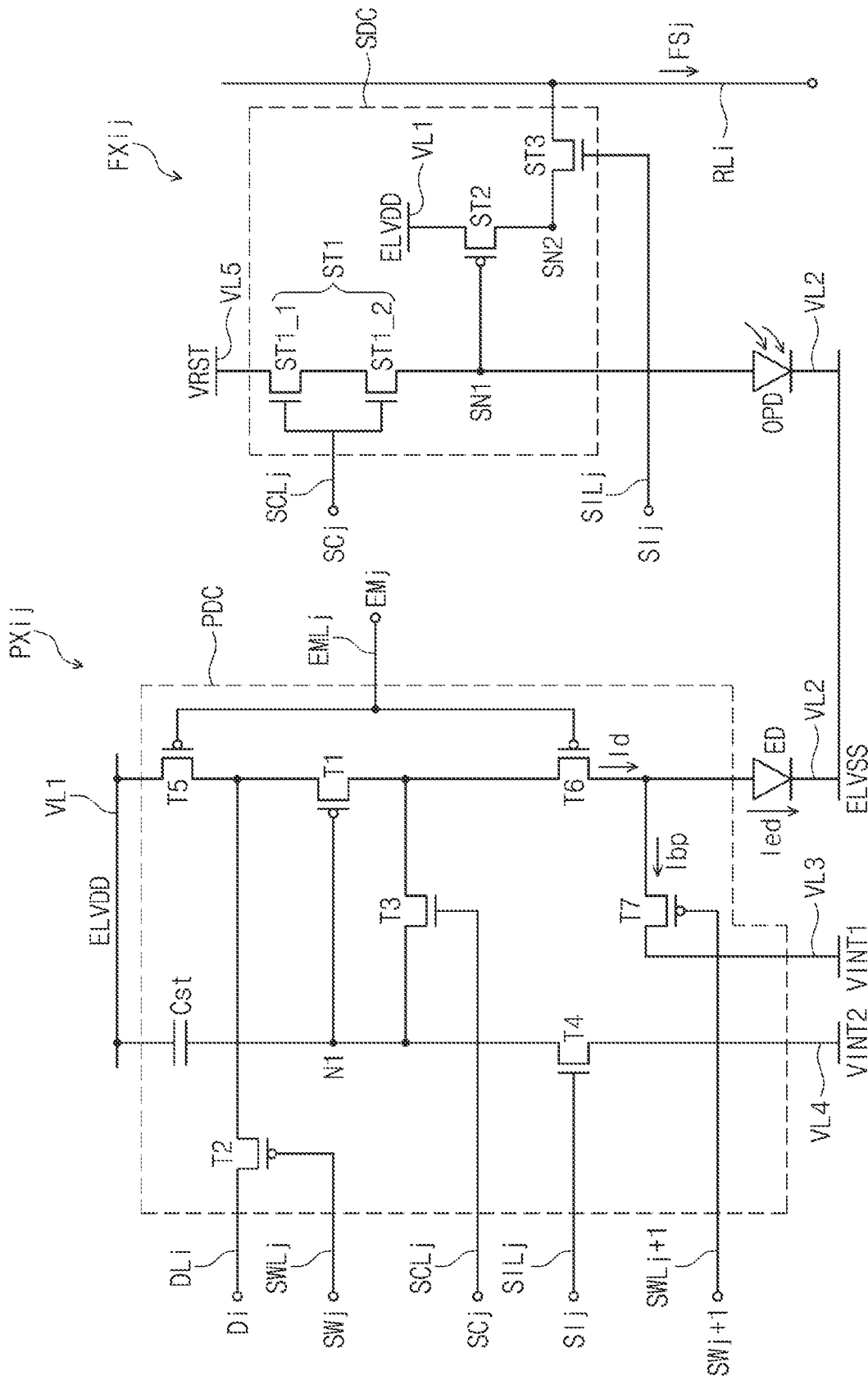
FIG. 5 is a circuit diagram illustrating a pixel driving circuit and a sensor driving circuit according to an embodiment of the inventive concept.
Figure 6:
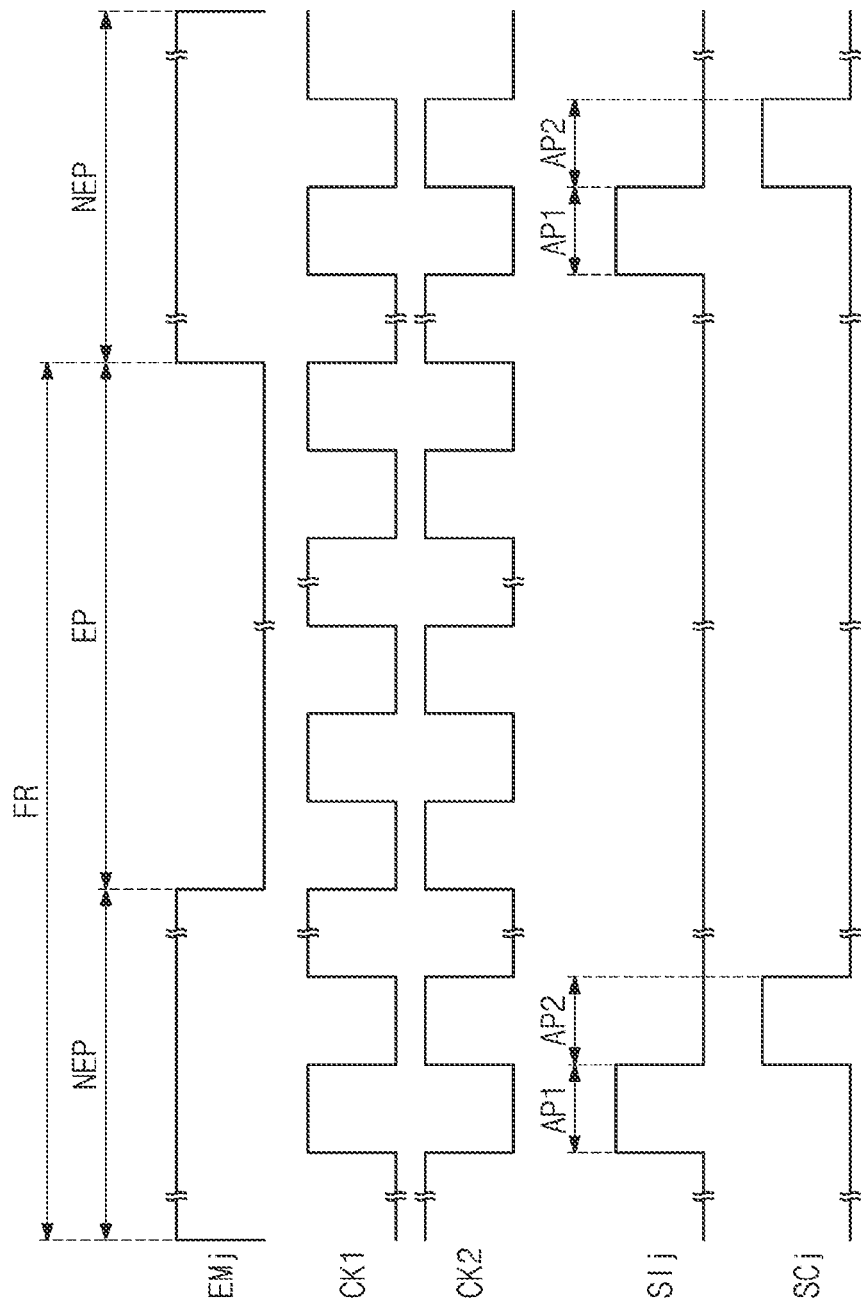
FIG. 6 is a waveform diagram illustrating an operation of the sensor driving circuit shown in FIG. 5.

FIG. 5 is a circuit diagram illustrating a pixel driving circuit and a sensor driving circuit according to an embodiment of the inventive concept. FIG. 6 is a waveform diagram illustrating an operation of the sensor driving circuit shown in FIG. 5.

FIG. 5 illustrates an example of a circuit structure of a pixel PXij which is one of the pixels PX of FIG. 3. All of the pixels PX may have substantially the same circuit structure, and thus, the circuit structure of the pixel PXij will be described in more detail below as a representative example of the pixels. In addition, FIG. 5 illustrates an example of a circuit structure of a sensor FXij, which is one of the sensors FX of FIG. 3. All of the sensors FX may have substantially the same circuit structure, and thus, the circuit structure of the sensor FXij will be described in more detail below as a representative example of the pixels.

Referring to FIG. 5, the pixel PXij may be coupled to an i-th data line DLi (hereinafter, a data line) of the data lines DL1 to DLm, a j-th initializing scan line SILj (hereinafter, an initializing scan line) of the initializing scan lines SIL1 to SILn, a j-th compensating scan line SCLj (hereinafter, a compensating scan line) of the compensating scan lines SCL1 to SCLn, j-th and (j+1)-th scan lines SWLj and SWLj+1 (hereinafter, first and second writing scan lines) of the writing scan lines SWL1 to SWLn, and a j-th emission control line EMLj (hereinafter, an emission control line) of the emission control lines EML1 to EMLn.

The pixel PXij may include an emission element ED and a pixel driving circuit PDC. The emission element ED may be a light-emitting diode. In an embodiment, the emission element ED may be an organic light emitting diode including an organic light-emitting layer.

The pixel driving circuit PDC may include first to seventh transistors T1, T2, T3, T4, T5, T6, and T7 and one capacitor Cst. Each of the first to seventh transistors T1 to T7 may be a transistor having a low-temperature polycrystalline silicon (LTPS) semiconductor layer. At least one of the first to seventh transistors T1 to T7 may be a p-type transistor and at least one of the others may be an n-type transistor. For example, in the first to seventh transistors T1 to T7, the first, second, fifth to seventh transistors T1, T2, and T5 to T7 may be PMOS transistors and the third and fourth transistors T3 and T4 may be NMOS transistors in which an oxide semiconductor material is used as a semiconductor layer. In an embodiment, at least one of the first to seventh transistors T1 to T7 may be of an n-type and the others may be of a p-type. However, the inventive concept is not limited to the structure of the pixel driving circuit PDC shown in FIG. 5. FIG. 5 illustrates just one example of possible structures of the pixel driving circuit PDC, and the structure of the pixel driving circuit PDC may be variously changed in embodiments of the inventive concept. For example, all of the first to seventh transistors T1 to T7 may be p-type transistors or may be n-type transistors.

The initializing scan line SILj, the compensating scan line SCLj, the first and second writing scan lines SWLj and SWLj+1, and the emission control line EMLj may be respectively used to transmit a j-th initializing scan signal SIj (hereinafter, an initializing scan signal), a j-th compensating scan signal SCj (hereinafter, a compensating scan signal), j-th and (j+1)-th writing scan signals SWj and SWj+1 (hereinafter, first and second writing scan signals), and a j-th emission control signal EMj (hereinafter, an emission control signal) to the pixel PXij. The data line DLi may be used to transmit a data signal Di to the pixel PXij. The data signal Di may have a voltage level corresponding to the image signal RGB which is input to the display device DD (e.g., see FIG. 3).

First and second driving voltage lines VL1 and VL2 may be respectively used to transmit the first driving voltage ELVDD and the second driving voltage ELVSS to the pixel PXij. In addition, first and second initializing voltage lines VL3 and VL4 may be respectively used to transmit the first initializing voltage VINT1 and the second initializing voltage VINT2 to the pixel PXij.

The first transistor T1 may be connected between the first driving voltage line VL1 to which the first driving voltage ELVDD is applied and the emission element ED. The first transistor T1 may include a first electrode which is connected to the first driving voltage line VL1 via the fifth transistor T5, a second electrode which is electrically connected to an anode of the emission element ED through the sixth transistor T6, and a third electrode, which is connected to a first node N1. The first transistor T1 may receive the data signal Di from the data line DLi depending on a switching operation of the second transistor T2 and may supply a driving current Id to the emission element ED.

The second transistor T2 may be connected between the data line DLi and the first electrode of the first transistor T1. The second transistor T2 may include a first electrode connected to the data line DLi, a second electrode connected to the first electrode of the first transistor T1, and a third electrode connected to the first writing scan line SWLj. If the second transistor T2 is turned on by the first writing scan signal SWj transmitted through the first writing scan line SWLj, the second transistor T2 may transmit the data signal Di which is received from the data line DLi to the first electrode of the first transistor T1.

The third transistor T3 may be connected between the second electrode of the first transistor T1 and the first node N1. The third transistor T3 may include a first electrode connected to the second electrode of the first transistor T1, a second electrode connected to the first node N1, and a third electrode connected to the compensating scan line SCLj. If the third transistor T3 is turned on by the compensating scan signal SCj transmitted through the compensating scan line SCLj, the third transistor T3 may connect the second and third electrodes of the first transistor T1 to each other, and in this case, the first transistor T1 may behave like a diode.

The fourth transistor T4 may be connected between the second initializing voltage line VL4 to which the second initializing voltage VINT2 is applied and the first node N1. The fourth transistor T4 may include a first electrode connected to the third electrode of the first transistor T1, a second electrode connected to the second initializing voltage line VL4 applied with the second initializing voltage VINT2, and a third electrode connected to the initializing scan line SILj. The fourth transistor T4 may be turned on or off depending on the initializing scan signal SIj transmitted through the initializing scan line SILj. If the fourth transistor T4 is turned on, the fourth transistor T4 may transmit the second initializing voltage VINT2 to the third electrode of the first transistor T1, and in this case, an electric potential of the third electrode of the first transistor T1 (i.e., an electric potential of the first node N1) may be initialized.

The fifth transistor T5 may include a first electrode connected to the first driving voltage line VL1, a second electrode connected to the first electrode of the first transistor T1, and a third electrode connected to the emission control line EMLj. The fifth transistor T5 may be referred to as a first emission control transistor.

The sixth transistor T6 may include a first electrode connected to the second electrode of the first transistor T1, a second electrode connected to the anode of the emission element ED, and a third electrode connected to the emission control line EMLj. The sixth transistor T6 may be referred to as a second emission control transistor.

The fifth transistor T5 and the sixth transistor T6 may be simultaneously turned on or off by the emission control signal EMj transmitted through the emission control line EMLj. If the fifth transistor T5 is turned on, the first driving voltage ELVDD applied through the fifth transistor T5 may be delivered to the emission element ED through the diode connected first transistor T1.

The seventh transistor T7 may include a first electrode connected to the first initializing voltage line VL3 applied with the first initializing voltage VINT1, a second electrode connected to the second electrode of the sixth transistor T6, and a third electrode connected to the second writing scan line SWLj+1. The first initializing voltage VINT1 may have a voltage level that is lower than or equal to the second initializing voltage VINT2. In an embodiment, each of the first and second initializing voltages VINT1 and VINT2 may be −3.5 V.

The one end of the capacitor Cst may be connected to the first node N1 (the third electrode of the first transistor T1), as described above, and the other end of the capacitor Cst may be connected to the first driving voltage line VL1. A cathode of the emission element ED may be connected to the second driving voltage line VL2 which supplies the second driving voltage ELVSS. The second driving voltage ELVSS may have a voltage level that is lower than the first driving voltage ELVDD. In an embodiment, the second driving voltage ELVSS may have a voltage level that is lower than the first and second initializing voltages VINT1 and VINT2.

If the initializing scan signal SIj of high level is provided through the initializing scan line SILj, the fourth transistor T4 may be turned on in response to the initializing scan signal SIj of high level. The second initializing voltage VINT2 may be applied to the third electrode of the first transistor T1 through the turned-on fourth transistor T4 and, in this case, the first node N1 may be initialized by the second initializing voltage VINT2. Thus, a high level period of the initializing scan signal SIj may be an initializing period of the pixel PXij.

Next, if the compensating scan signal SCj of high level is supplied to the third transistor T3 through the compensating scan line SCLj, the third transistor T3 may be turned on. If the third transistor T3 is turned on, the first transistor T1 may behave like a diode in a forward bias condition. In addition, the second transistor T2 may be turned on by the first writing scan signal SWj of low level. Then, the third electrode of the first transistor T1 may be applied with a compensation voltage "Di-Vth" that is given by subtracting a threshold voltage Vth of the first transistor T1 from a voltage of the data signal Di supplied from the data line DLi. In other words, an electric potential at the third electrode of the first transistor T1 may become the compensating voltage "Di-Vth".

The first driving voltage ELVDD and the compensation voltage "Di-Vth" may be applied to opposite ends of the capacitor Cst, and in this case, the capacitor Cst may store electric charges whose amount is determined by a voltage difference between its opposite ends. Here, a high level period of the compensating scan signal SCj may be referred to as a compensating period of the pixel PXij.

Meanwhile, if the second writing scan signal SWj+1 of low level is applied to the seventh transistor T7 through the second writing scan line SWLj+1, the seventh transistor T7 may be turned on. In this case, a part of the driving current Id which is a bypass current Ibp may be discharged through the seventh transistor T7.

If the emission element ED emits light when the minimum driving current Id (a leakage current of the first transistor T1) flows through the first transistor T1, a black image may not be normally displayed. However, according to an embodiment of the inventive concept, the seventh transistor T7 in the pixel PXij may discharge a part of the minimum driving current Id of the first transistor T1 to a current path which is different from a current path to the light-emitting element ED as the bypass current Ibp. Here, the minimum driving current Id of the first transistor T1 may mean a current that flows through the first transistor T1 when a gate-source voltage Vgs of the first transistor T1 is lower than the threshold voltage Vth (that is, when the first transistor T1 is in a turn-off state). In the case where, under the turn-off condition of the first transistor T1, the minimum driving current Id (e.g., less than 10 pA) is supplied to the emission element ED, the pixel PXij may display a black luminance image. When the minimum driving current Id displaying the black image flows through the first transistor T1, the bypass current Ibp may greatly affect the minimum driving current Id, but when a large amount of driving current Id displaying an image of typical color or white color flows through the first transistor T1, there may be almost no influence of the bypass current Ibp. Thus, when the minimum driving current Id displaying a black image flows through the first transistor T1, a light-emitting current Ied of the light-emitting element ED, which corresponds to a result of subtracting the bypass current Ibp discharged through the seventh transistor T7 from the driving current Id, may have the minimum current amount to such an extent as to accurately express a black image. Accordingly, a contrast ratio may be improved by implementing an accurate black luminance image by using the seventh transistor T7.

Next, the emission control signal EMj supplied from the emission control line EMLj may be changed from a high level to a low level. The fifth transistor T5 and the sixth transistor T6 may be turned on by the emission control signal EMj of low level. Then, the driving current Id may be produced, due to a difference between the voltage of the third electrode of the first transistor T1 and the first driving voltage ELVDD, and the driving current Id may be supplied to the emission element ED through the sixth transistor T6 to form a current Ied passing through the emission element ED.

Referring to FIG. 5, the sensor FXij may be coupled to an i-th readout line RLi (hereinafter, a readout line) of the readout lines RL1 to RLm, the initializing scan line SILj, and the compensating scan line SCLj. The sensor FXij may be further coupled to the first and second driving voltage lines VL1 and VL2 and a reset voltage line VL5.

The sensor FXij may include the light sensing element OPD and the sensor driving circuit SDC. The light sensing element OPD may be a photodiode. In an embodiment, the light sensing element OPD may be an organic photodiode in which an organic material is used as its photoelectric conversion layer. An anode of the light sensing element OPD may be connected to a first sensing node SN1 and a cathode of the light sensing element OPD may be connected to the second driving voltage line VL2 which is used to transmit the second driving voltage ELVSS.

The sensor driving circuit SDC may include three transistors ST1 to ST3. For example, the transistors ST1 to ST3 may include a reset transistor ST1, an amplifying transistor ST2, and an output transistor ST3. At least one of the reset transistor ST1, the amplifying transistor ST2, and the output transistor ST3 may be of a p-type transistor, and the others may be of an n-type. In an embodiment, the amplifying transistor ST2 may be a PMOS transistor, and the reset transistor ST1 and the output transistor ST3 may be NMOS transistors. However, the inventive concept is not limited to this example, and in an embodiment, all of the reset transistor ST1, the amplifying transistor ST2, and the output transistor ST3 may be of the n-type or may be of the p-type.

Some of the reset transistor ST1, the amplifying transistor ST2, and the output transistor ST3, for example, the reset transistor ST1 and the output transistor ST3, may be transistors that are of the same type as the third and fourth transistors T3 and T4 of the pixel PXij. At least one of the reset transistor ST1, the amplifying transistor ST2, and the output transistor ST3, for example, the amplifying transistor ST2, may be a transistor that is of the same type as the first and second transistors T1 and T2 of the pixel PXij.

The inventive concept is not limited to the circuit structure of the sensor driving circuit SDC shown in FIG. 5. The sensor driving circuit SDC shown in FIG. 5 may be just one example of the inventive concept, and the structure of the sensor driving circuit SDC may be variously changed.

The reset transistor ST1 may include a first electrode connected to the reset voltage line VL5 receiving the reset voltage VRST, a second electrode connected to the first sensing node SN1, and a third electrode connected to the compensating scan line SCLj receiving the compensating scan signal SCj. The reset transistor ST1 may reset an electric potential of the first sensing node SN1 to the reset voltage VRST in response to the compensating scan signal SCj. In an embodiment, the reset voltage VRST may have the same voltage level as the voltage level corresponding to the activation period (i.e., the low level period) of the first and second writing scan signals SWj and SWj+1. The reset voltage VRST may be a DC voltage whose voltage level is lower than that of the second driving voltage ELVSS.

The reset transistor ST1 may include a plurality of sub-reset transistors which are connected in series between the reset voltage line VL5 and the first sensing node SN1. In an embodiment, the reset transistor ST1 may include a first sub-reset transistor ST1_1 and a second sub-reset transistor ST1_2. The third electrode of the first sub-reset transistor ST1_1 and the third electrode of the second sub-reset transistor ST1_2 may be connected to the compensating scan line SCLj. In addition, the second electrode of the first sub-reset transistor ST1_1 may be electrically connected to the first electrode of the second sub-reset transistor ST1_2. Furthermore, the first electrode of the first sub-reset transistor ST1_1 may be connected to the reset voltage line VL5, and the second electrode of the second sub-reset transistor ST1_2 may be electrically connected to the first sensing node SN1. However, the number of the sub-reset transistors is not limited thereto and may be variously changed.

The amplifying transistor ST2 may include a first electrode connected to the first driving voltage line VL1 receiving the first driving voltage ELVDD, a second electrode connected to a second sensing node SN2, and a third electrode connected to the first sensing node SN1. If the amplifying transistor ST2 is turned on by an electric potential of the first sensing node SN1, the first driving voltage ELVDD may be applied to the second sensing node SN2.

The output transistor ST3 may include a first electrode connected to the second sensing node SN2, a second electrode connected to the readout line RLi, and a third electrode connected to the initializing scan line SILj receiving the initializing scan signal SIj. The output transistor ST3 may transmit a sensing signal FSi to the readout line RLi in response to the initializing scan signal SIj.

Referring to FIG. 6, each frame FR may include an emission period EP and a non-emission period NEP which are classified based on an operation of the pixel PXij. The emission period EP may correspond to a low level period (i.e., an activation period) of the emission control signal EMj, and the non-emission period NEP may correspond to a high level period (i.e., an inactivation period) of the emission control signal EMj. In an embodiment, in the case where the display panel DP of FIG. 3 is operated with a frequency of 60 Hz, each frame FR may have a duration time of 16.7 ms. The duration time of each frame FR may be changed depending on the operation frequency of the display panel DP.

Each frame FR may include a sensing period AP1, a reset period AP2, and a light exposure period which are classified based on an operation of the sensor FXij. The sensing period AP1 and the reset period AP2 may be overlapped with the non-emission period NEP. The light exposure period of the sensor FXij may correspond to the emission period EP of the pixel PXij. During the emission period EP, the light sensing element OPD may be exposed to light. The light may be light that is emitted from the emission element ED of the pixel PXij.

If a display surface is touched by the user's hand US_F (e.g., see FIG. 1), the light sensing element OPD may generate photo-charges which correspond to light reflected by ridges, or valleys between the ridges, of a fingerprint, and the generated photo-charges may be accumulated in the first sensing node SN1.

The amplifying transistor ST2 may be a source-follower-buffer amplifier which is configured to produce a source-drain current in proportion to an amount of charges accumulated in the first sensing node SN1 which is connected to its third electrode.

During the sensing period AP1, the initializing scan signal SIj of high level may be supplied to the output transistor ST3 through the initializing scan line SILj. The sensing period AP1 may be defined as an activation period (i.e., a high level period) of the initializing scan signal SIj. A duration time of the activation period of the initializing scan signal SIj and the compensating scan signal SCj may be determined by a duration time of a high period of a corresponding clock signal. For example, the initializing scan signal SIj may have an activation period corresponding to a high period of a corresponding first clock signal CK1, and the compensating scan signal SCj may have an activation period corresponding to a high period of a corresponding second clock signal CK2. Phases of the first and second clock signals CK1 and CK2 may be inverse to each other. Thus, the activation period of the initializing scan signal SIj may not be overlapped with the activation period of the compensating scan signal SCj.

If the output transistor ST3 is turned on in response to the initializing scan signal SIj of high level, the sensing signal FSi which corresponds to a current flowing through the amplifying transistor ST2 may be output to the readout line RLi. The sensing period AP1 of the sensor FXij may correspond to the initializing period of the pixel PXij.

Next, during the reset period AP2, if the compensating scan signal SCj of high level is supplied to the reset transistor ST1 through the compensating scan line SCLj, the reset transistor ST1 may be turned on. The reset period AP2 may be defined as an activation period (i.e., a high level period) of the compensating scan signal SCj. Here, since the reset voltage VRST is provided to the first electrode of the reset transistor ST1, the first sensing node SN1 may be reset to the reset voltage VRST. The reset period AP2 of the sensor FXij may correspond to the compensating period of the pixel PXij.

Next, during the emission period EP, the light sensing element OPD may generate photo-charges, which correspond to a received light, and the generated photo-charges may be accumulated in the first sensing node SN1.

As described above, the pixel PXij and the sensor FXij may be provided in the display panel DP, and the sensor FXij may be driven by using the initializing scan signal SIj and the compensating scan signal SCj for driving the pixel PXij. In particular, the initializing scan signal SIj and the compensating scan signal SCj which are supplied to the third and fourth transistors T3 and T4 of the pixel PXij may be supplied to the reset transistor ST1 and the output transistor ST3 of the sensor FXij. Thus, it is unnecessary to prepare an additional signal line or an additional circuit for driving the sensor FXij, and, moreover, it may be possible to avoid a reduction in opening ratio of the display device even when the sensor FXij is disposed in the display panel DP.

Figure 7:
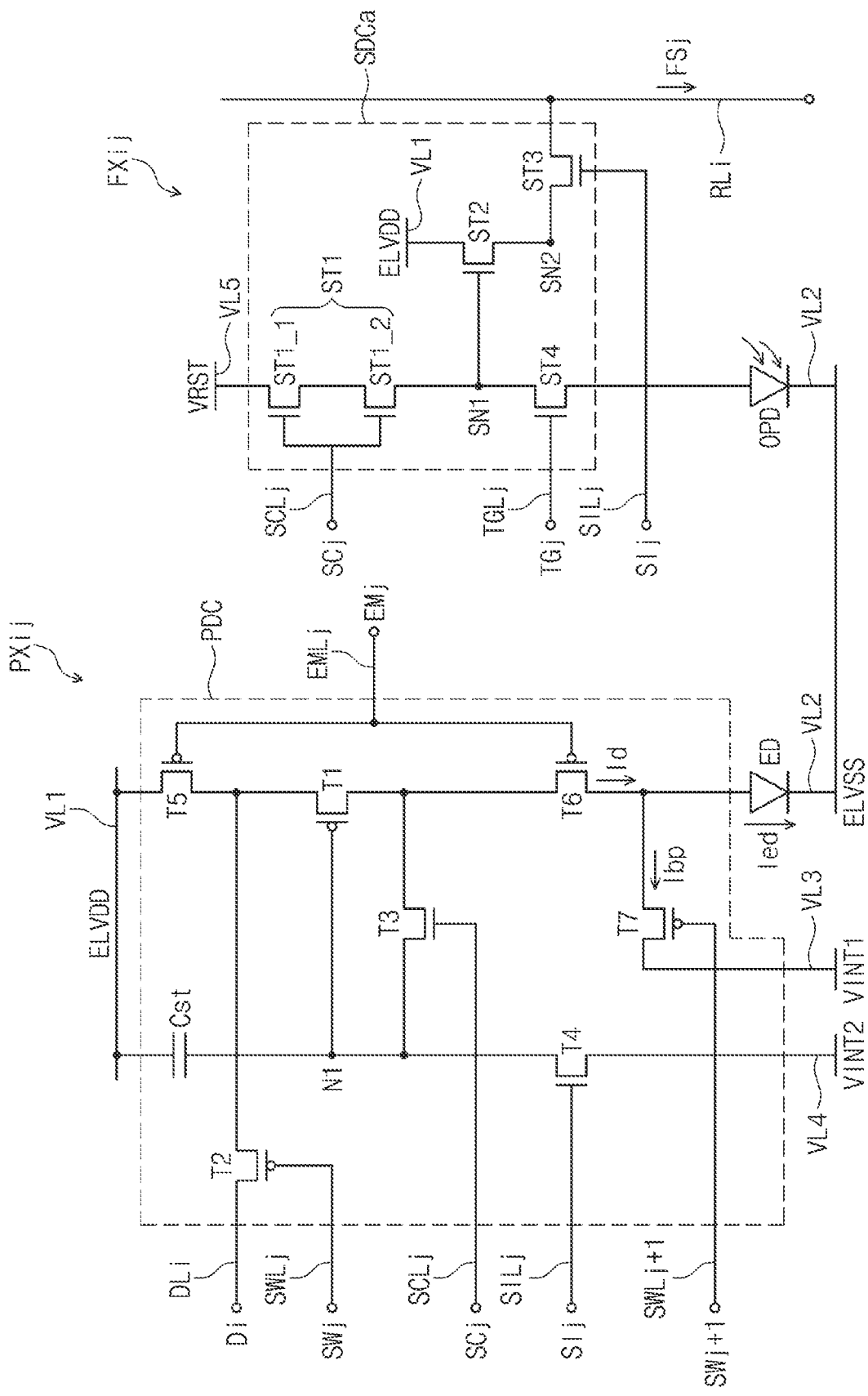
FIG. 7 is a circuit diagram illustrating a pixel driving circuit and a sensor driving circuit according to an embodiment of the inventive concept.
Figure 8:
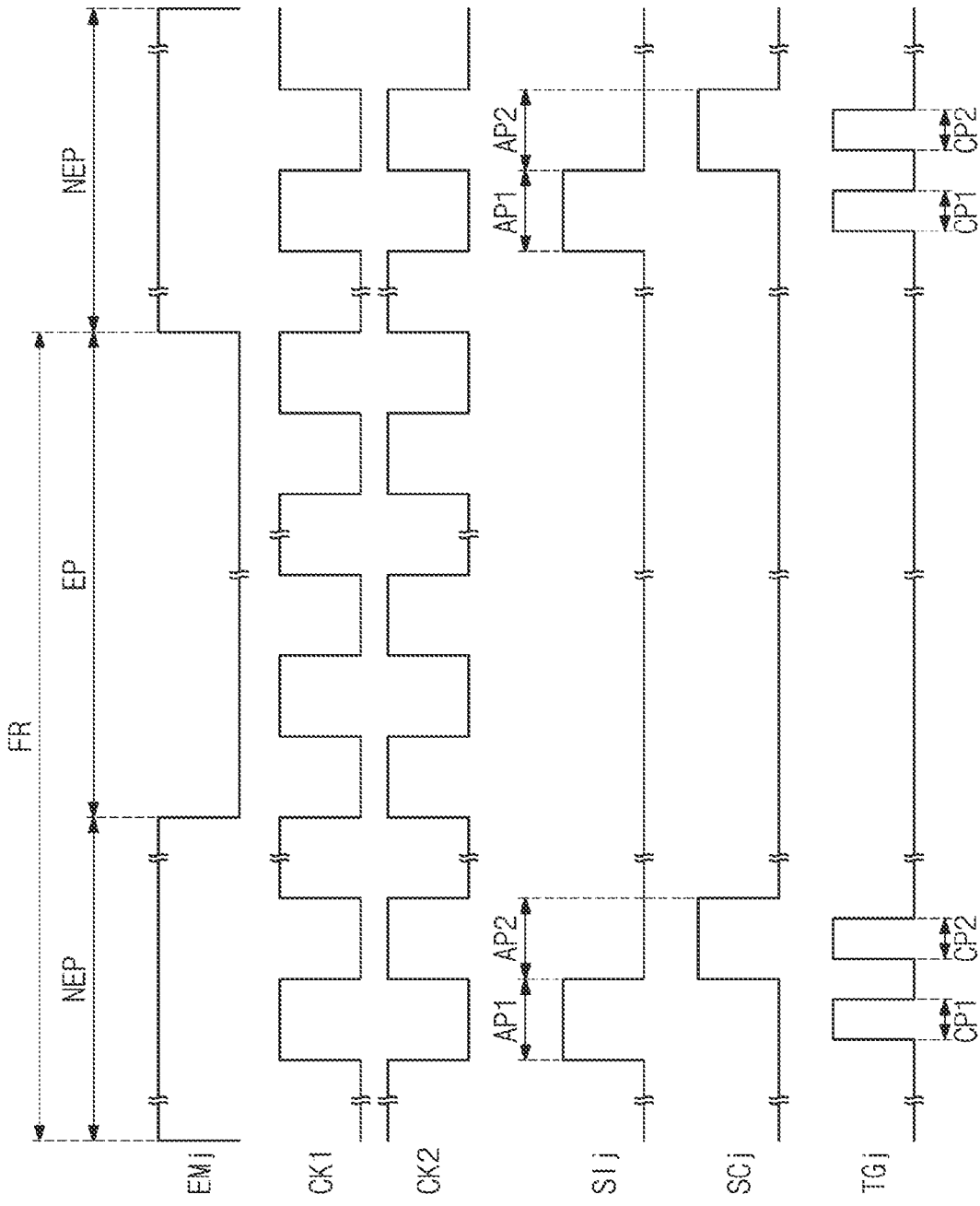
FIG. 8 is a waveform diagram illustrating an operation of the sensor driving circuit shown in FIG. 7.

FIG. 7 is a circuit diagram illustrating a pixel driving circuit and a sensor driving circuit according to an embodiment of the inventive concept, and FIG. 8 is a waveform diagram illustrating an operation of the sensor driving circuit shown in FIG. 7. In the following description of FIGS. 7 and 8, an element previously described with reference to FIGS. 5 and 6 will be identified by the same reference number without repeating an overlapping description thereof. For example, the pixel PXij of FIG. 7 may have the same structure as the pixel PXij of FIG. 5, and thus, a detailed description of the pixel PXij will be omitted.

Referring to FIG. 7, the sensor FXij may be coupled to an i-th readout line RLi (hereinafter, a readout line) of the readout lines RL1 to RLm, the initializing scan line SILj, the compensating scan line SCLj, and a control scan line TGLj. The sensor FXij may be further coupled to the first and second driving voltage lines VL1 and VL2 and the reset voltage line VL5.

The sensor FXij may include the light sensing element OPD and a sensor driving circuit SDCa. The light sensing element OPD may be a photodiode. In an embodiment, the light sensing element OPD may be an organic photodiode in which an organic material is used as its photoelectric conversion layer. The anode of the light sensing element OPD may be connected to the first sensing node SN1, and the cathode of the light sensing element OPD may be connected to the second driving voltage line VL2 which is used to transmit the second driving voltage ELVSS.

The sensor driving circuit SDCa may include four transistors ST1 to ST4. For example, the transistors ST1 to ST4 may include the reset transistor ST1, the amplifying transistor ST2, the output transistor ST3, and the control transistor ST4. In an embodiment, all of the reset transistor ST1, the amplifying transistor ST2, the output transistor ST3, and the control transistor ST4 may be NMOS transistors. The reset transistor ST1, the amplifying transistor ST2, the output transistor ST3, and the control transistor ST4 may be transistors that are of the same type as the third and fourth transistors T3 and T4 of the pixel PXij. However, the inventive concept is not limited to this example, and in an embodiment, at least one of the reset transistor ST1, the amplifying transistor ST2, the output transistor ST3, and the control transistor ST4 may be a p-type transistor, and others may be n-type transistors.

The inventive concept is not limited to the circuit structure of the sensor driving circuit SDCa shown in FIG. 7. The sensor driving circuit SDCa shown in FIG. 7 may be just one example of the inventive concept, and the structure of the sensor driving circuit SDCa may be variously changed.

The reset transistor ST1 may include a first electrode connected to the reset voltage line VL5 receiving the reset voltage VRST, a second electrode connected to the first sensing node SN1, and a third electrode connected to the compensating scan line SCLj receiving the compensating scan signal SCj. The reset transistor ST1 may reset an electric potential of the first sensing node SN1 to the reset voltage VRST in response to the compensating scan signal SCj.

The reset transistor ST1 may include a plurality of sub-reset transistors which are connected in series between the reset voltage line VL5 and the first sensing node SN1. In an embodiment, the reset transistor ST1 may include the first sub-reset transistor ST1_1 and the second sub-reset transistor ST1_2. The third electrode of the first sub-reset transistor ST1_1 and the third electrode of the second sub-reset transistor ST1_2 may be connected to the compensating scan line SCLj. In addition, the second electrode of the first sub-reset transistor ST1_1 and the first electrode of the second sub-reset transistor ST1_2 may be electrically connected to each other. Furthermore, the first electrode of the first sub-reset transistor ST1_1 may be connected to the reset voltage line VL5, and the second electrode of the second sub-reset transistor ST1_2 may be electrically connected to the first sensing node SN1.

The amplifying transistor ST2 may include a first electrode connected to the first driving voltage line VL1 receiving the first driving voltage ELVDD, a second electrode connected to the second sensing node SN2, and a third electrode connected to the first sensing node SN1. If the amplifying transistor ST2 is turned on by an electric potential of the first sensing node SN1, the first driving voltage ELVDD may be applied to the second sensing node SN2.

The output transistor ST3 may include a first electrode connected to the second sensing node SN2, a second electrode connected to the readout line RLi, and a third electrode connected to the initializing scan line SILj receiving the initializing scan signal SIj. The output transistor ST3 may transmit the sensing signal FSi to the readout line RLi in response to the initializing scan signal SIj.

The control transistor ST4 may include a first electrode connected to the first sensing node SN1, a second electrode connected to the anode of the light sensing element OPD, and a third electrode connected to the control scan line TGLj receiving a control scan signal TGj. The control transistor ST4 may electrically connect the first sensing node SN1 to the light sensing element OPD, in response to the control scan signal TGj.

Referring to FIG. 7 and FIG. 8, each frame FR may include the emission period EP and the non-emission period NEP which are classified based on an operation of the pixel PXij. The emission period EP may correspond to a low level period (i.e., an activation period) of the emission control signal EMj and the non-emission period NEP may correspond to a high level period (i.e., an inactivation period) of the emission control signal EMj.

Each frame FR may include the sensing period AP1, the reset period AP2, and the light exposure period which are classified based on an operation of the sensor FXij. The sensing period AP1 and the reset period AP2 may be overlapped with the non-emission period NEP. The light exposure period of the sensor FXij may correspond to the emission period EP of the pixel PXij. During the emission period EP, the light sensing element OPD may be exposed to light. The light may be light that is emitted from the emission element ED of the pixel PXij. If a display surface is touched by the user's hand US_F (e.g., see FIG. 1), the light sensing element OPD may generate photo-charges which correspond to light reflected by ridges, or valleys between the ridges, of a fingerprint, and the generated photo-charges may be accumulated in the first sensing node SN1.

The amplifying transistor ST2 may be a source-follower-buffer amplifier which is configured to produce a source-drain current in proportion to an amount of accumulated charges in the first sensing node SN1 which is connected to its third electrode.

During the sensing period AP1, the initializing scan signal SIj of high level may be supplied to the output transistor ST3 through the initializing scan line SILj. The sensing period AP1 may be defined as an activation period (i.e., a high level period) of the initializing scan line SILj. The sensing period AP1 may include a first control period CP1. During the first control period CP1, the control scan signal TGj of high level may be supplied through the control scan line TGLj. When the output transistor ST3 is turned on in response to the initializing scan signal SIj of high level, the control transistor ST4 may be turned on in response to the control scan signal TGj of high level. Then, the sensing signal FSi which corresponds to a current flowing through the amplifying transistor ST2 may be output to the readout line RLi in response to an amount of photo-charges accumulated in the first sensing node SN1.

Next, during the reset period AP2, if the compensating scan signal SCj of high level is supplied to the reset transistor ST1 through the compensating scan line SCLj, the reset transistor ST1 may be turned on. The reset period AP2 may be defined as an activation period (i.e., a high level period) of the compensating scan signal SCj. Here, since the reset voltage VRST is provided to the first electrode of the reset transistor ST1, the first sensing node SN1 may be reset to the reset voltage VRST. The reset period AP2 may include a second control period CP2. During the second control period CP2, the control scan signal TGj of high level may be supplied through the control scan line TGLj. If the control transistor ST4 is turned on in response to the control scan signal TGj of high level when the reset transistor ST1 is turned on, the anode of the light sensing element OPD may also be reset to the reset voltage VRST. Thus, the first sensing node SN1 may be reset by the reset period AP2 before the emission period EP is started.

Next, during the emission period EP, the light sensing element OPD may generate photo-charges, which correspond to a received light, and the generated photo-charges may be accumulated in the first sensing node SN1 during the first control period CP1 in another frame.

As described above, the pixel PXij and the sensor FXij may be provided in the display panel DP, and the sensor FXij may be driven using the initializing scan signal SIj and the compensating scan signal SCj for driving the pixel PXij. In particular, the initializing scan signal SIj and the compensating scan signal SCj, which are supplied to the third and fourth transistors T3 and T4 of the pixel PXij, may be supplied to the reset transistor ST1 and the output transistor ST3 of the sensor FXij. Thus, it is unnecessary to prepare an additional signal line or an additional circuit for driving the sensor FXij, and moreover, it may be possible to avoid a reduction in opening ratio of the display device even when the sensor FXij is disposed in the display panel DP.

Figure 9:
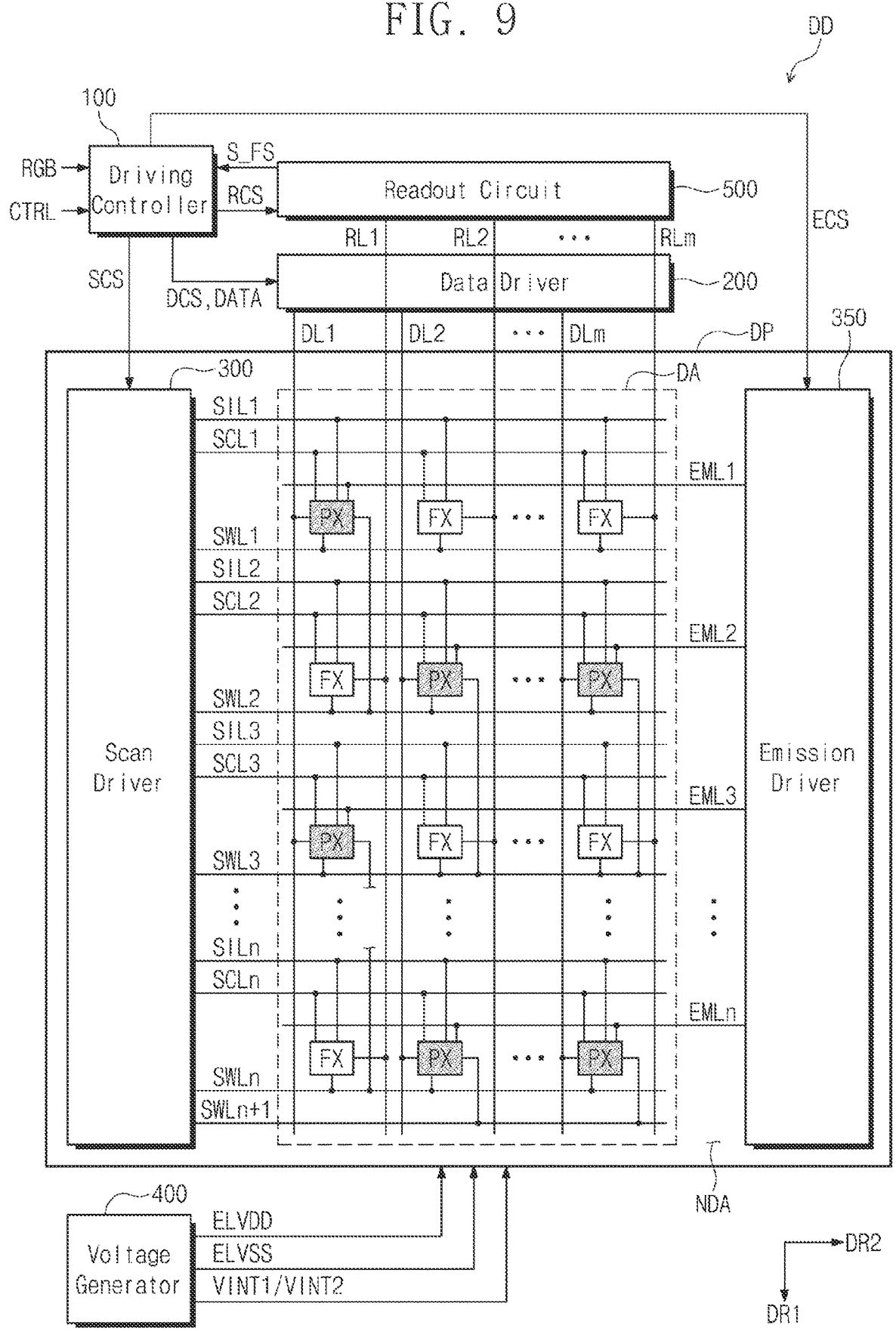
FIG. 9 is a block diagram illustrating a display device according to an embodiment of the inventive concept.
Figure 10:
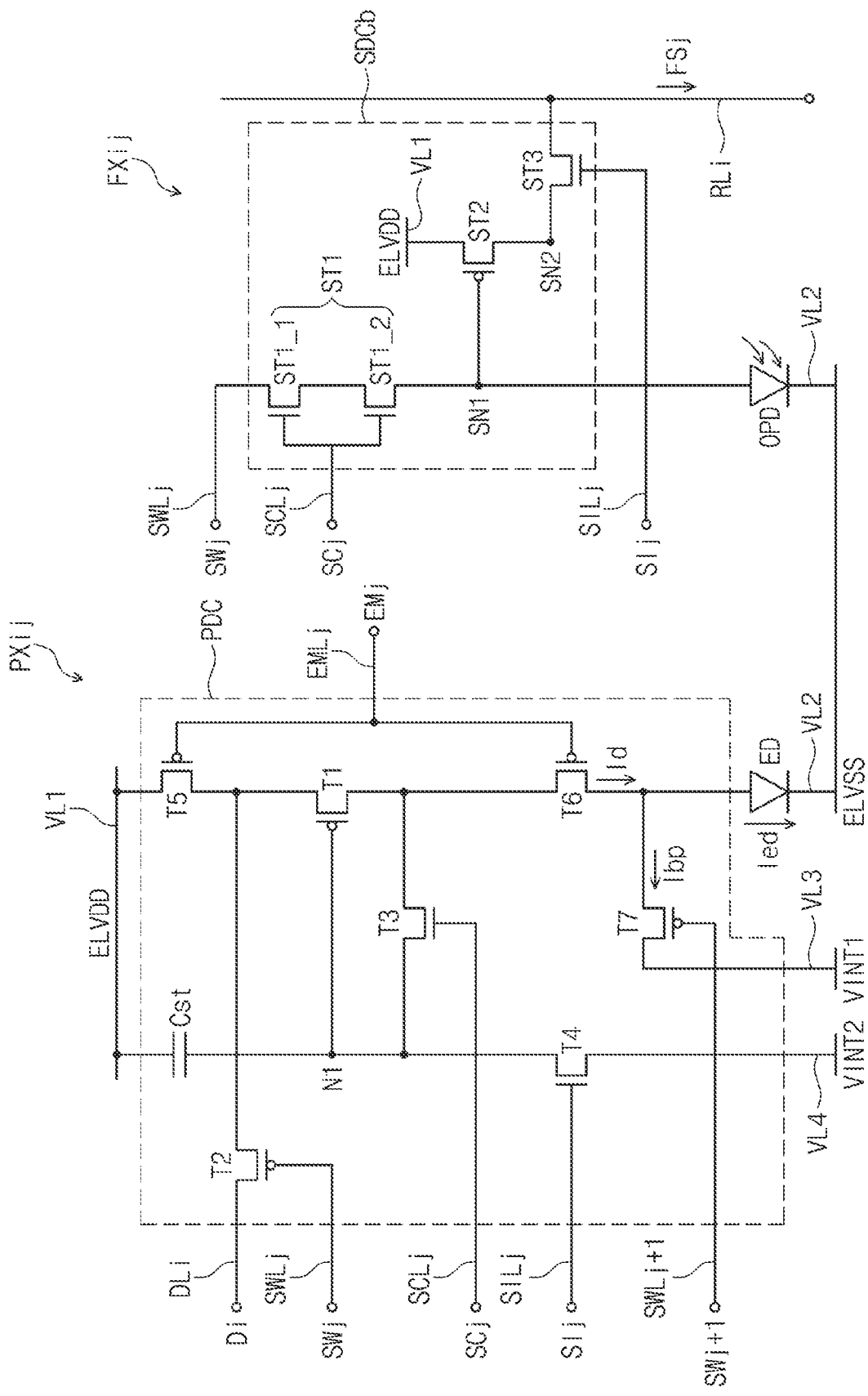
FIG. 10 is a circuit diagram illustrating a sensor driving circuit according to an embodiment of the inventive concept.
Figure 11:
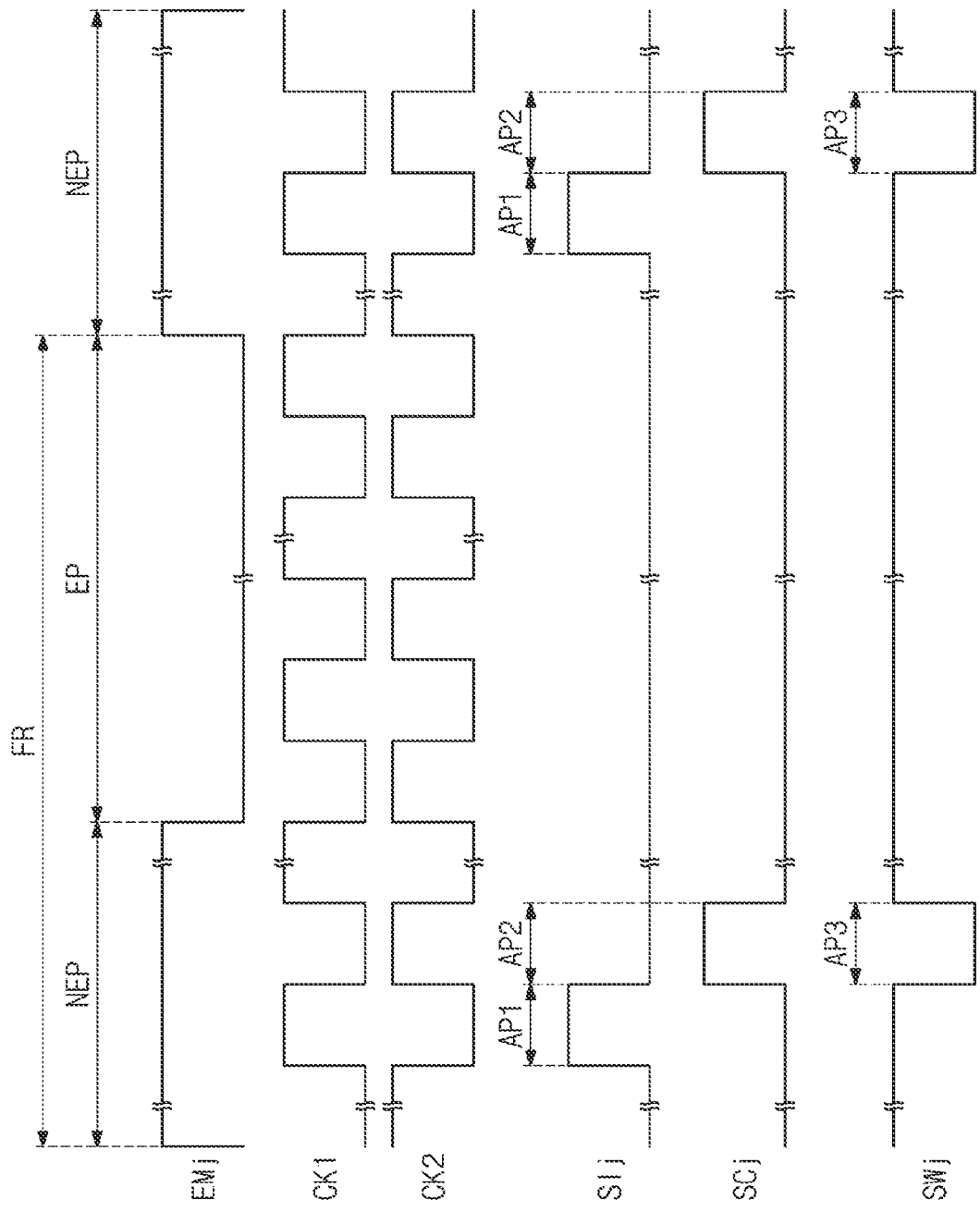
FIG. 11 is a waveform diagram illustrating an operation of the sensor driving circuit shown in FIG. 10.

FIG. 9 is a block diagram illustrating a display device according to an embodiment of the inventive concept, FIG. 10 is a circuit diagram illustrating a sensor driving circuit according to an embodiment of the inventive concept, and FIG. 11 is a waveform diagram illustrating an operation of the sensor driving circuit shown in FIG. 10. In the following description of FIGS. 9 to 11, an element previously described with reference to FIGS. 3 and 6 will be identified by the same reference number without repeating an overlapping description thereof. For example, the pixel PXij of FIG. 10 may have the same structure as the pixel PXij of FIG. 5, and thus, a detailed description of the pixel PXij will be omitted.

Referring to FIG. 9, the sensors FX may be electrically connected to the initializing scan lines SIL1 to SILn, the compensating scan lines SCL1 to SCLn, the writing scan lines SWL1 to SWLn+1, and the readout lines RL1 to RLm, respectively. Each of the sensors FX may be electrically connected to three scan lines. For example, the sensors FX in the first row may be connected to the first initializing scan line SIL1, the first compensating scan line SCL1, and the first writing scan line SWL1. In addition, the sensors FX in the second row may be connected to the second initializing scan line SIL2, the second compensating scan line SCL2, and the second writing scan line SWL2.

The voltage generator 400 may generate various voltages which are used to operate the display panel DP. In the present embodiment, the voltage generator 400 may generate the first driving voltage ELVDD, the second driving voltage ELVSS, the first initializing voltage VINT1, and the second initializing voltage VINT2. In other words, when compared with the voltage generator 400 of FIG. 3, the voltage generator 400 of FIG. 9 may not generate the reset voltage VRST (e.g., see FIG. 3) supplied to each of the sensors FX.

Referring to FIG. 10, the sensor FXij may be coupled to the readout line RLi, the initializing scan line SILj, the compensating scan line SCLj, and the first writing scan line SWLj. The sensor FXij may be further coupled to the first and second driving voltage lines VL1 and VL2.

The sensor FXij may include the light sensing element OPD and the sensor driving circuit SDCb. The anode of the light sensing element OPD may be connected to the first sensing node SN1, and the cathode of the light sensing element OPD may be connected to the second driving voltage line VL2, which is used to transmit the second driving voltage ELVSS.

The sensor driving circuit SDCb may include three transistors ST1 to ST3. For example, the transistors ST1 to ST3 may be the reset transistor ST1, the amplifying transistor ST2, and the output transistor ST3. At least one of the reset transistor ST1, the amplifying transistor ST2, and the output transistor ST3 may be of a p-type transistor, and the others may be of an n-type. In an embodiment, the amplifying transistor ST2 may be a PMOS transistor, and the reset transistor ST1 and the output transistor ST3 may be NMOS transistors.

Some of the reset transistor ST1, the amplifying transistor ST2, and the output transistor ST3, for example, the reset transistor ST1 and the output transistor ST3, may be transistors that are of the same type as the third and fourth transistors T3 and T4 of the pixel PXij. At least one of the reset transistor ST1, the amplifying transistor ST2, and the output transistor ST3, for example, the amplifying transistor ST2, may be a transistor that is of the same type as the first and second transistors T1 and T2 of the pixel PXij.

The inventive concept is not limited to the structure of the sensor driving circuit SDCb shown in FIG. 10. The sensor driving circuit SDCb shown in FIG. 10 may be just one example of the inventive concept, and the structure of the sensor driving circuit SDCb may be variously changed.

The reset transistor ST1 may include a first electrode connected to the first writing scan line SWLj receiving the first writing scan signal SWj, a second electrode connected to the first sensing node SN1, and a third electrode connected to the compensating scan line SCLj receiving the compensating scan signal SCj. The reset transistor ST1 may apply the first writing scan signal SWj to the first sensing node SN1 in response to the compensating scan signal SCj. The reset transistor ST1 may include a plurality of sub-reset transistors which are connected in series between the reset voltage line VL5 and the first sensing node SN1.

The amplifying transistor ST2 may include a first electrode connected to the first driving voltage line VL1 receiving the first driving voltage ELVDD, a second electrode connected to a second sensing node SN2, and a third electrode connected to the first sensing node SN1. If the amplifying transistor ST2 is turned on by an electric potential of the first sensing node SN1, the first driving voltage ELVDD may be applied to the second sensing node SN2.

The output transistor ST3 may include a first electrode connected to the second sensing node SN2, a second electrode connected to the readout line RLi, and a third electrode connected to the initializing scan line SILj receiving the initializing scan signal SIj. The output transistor ST3 may transmit a sensing signal FSi to the readout line RLi in response to the initializing scan signal SIj.

Referring to FIG. 10 and FIG. 11, each frame FR may include the emission period EP and the non-emission period NEP which are classified based on an operation of the pixel PXij. The emission period EP may correspond to a low level period (i.e., an activation period) of the emission control signal EMj and the non-emission period NEP may correspond to a high level period (i.e., an inactivation period) of the emission control signal EMj.

Each frame FR may include the sensing period AP1, the reset period AP2, and the light exposure period which are classified based on an operation of the sensor FXij. The sensing period AP1 and the reset period AP2 may be overlapped with the non-emission period NEP. The light exposure period of the sensor FXij may correspond to the emission period EP of the pixel PXij. During the emission period EP, the light sensing element OPD may be exposed to light. The light may be light that is emitted from the emission element ED of the pixel PXij. The light sensing element OPD may generate photo-charges corresponding to an incident light and the generated photo-charges may be accumulated in the first sensing node SN1 during the emission period EP.

The amplifying transistor ST2 may be a source-follower-buffer amplifier which is configured to produce a source-drain current in proportion to an amount of charges in the first sensing node SN1 input to its third electrode.

During the sensing period AP1, the initializing scan signal SIj of high level may be supplied to the output transistor ST3 through the initializing scan line SILj. The sensing period AP1 may be defined as an activation period (i.e., a high level period) of the initializing scan line SILj. If the output transistor ST3 is turned on in response to the initializing scan signal SIj of high level, the sensing signal FSi which corresponds to a current flowing through the amplifying transistor ST2 may be output to the readout line RLi.

Next, during the reset period AP2, if the compensating scan signal SCj of high level is supplied to the reset transistor ST1 through the compensating scan line SCLj, the reset transistor ST1 may be turned on. The reset period AP2 may be defined as an activation period (i.e., a high level period) of the compensating scan line SCLj. Here, since the first writing scan signal SWj is provided to the first electrode of the reset transistor ST1, the first sensing node SN1 may be reset by the first writing scan signal SWj. The first writing scan signal SWj may have a low level during an activation period AP3 overlapped with the reset period AP2. Thus, during the reset period AP2, the first sensing node SN1 may have an electric potential corresponding to the first writing scan signal SWj of low level. In an embodiment, the low level of the first writing scan signal SWj may have a voltage level that is lower than the second driving voltage ELVSS. Accordingly, the first sensing node SN1 may be reset by the reset period AP2, before the emission period EP is started.

Next, during the emission period EP, the light sensing element OPD may generate photo-charges, which correspond to a received light, and the generated photo-charges may be accumulated in the first sensing node SN1.

As described above, the pixel PXij and the sensor FXij may be provided in the display panel DP, and the sensor FXij may be driven using the initializing scan signal SIj, the compensating scan signal SCj, and the first writing scan signal SWj for driving the pixel PXij. In particular, the initializing scan signal SIj, the compensating scan signal SCj, and the first writing scan signal SWj, which are supplied to the third and fourth transistors T3 and T4 of the pixel PXij, may be supplied to the reset transistor ST1 and the output transistor ST3 of the sensor FXij. Thus, it is unnecessary to prepare an additional signal line or an additional circuit for driving the sensor FXij and, moreover, it may be possible to avoid a reduction in opening ratio of the display device even when the sensor FXij is disposed in the display panel DP.

Figure 12:
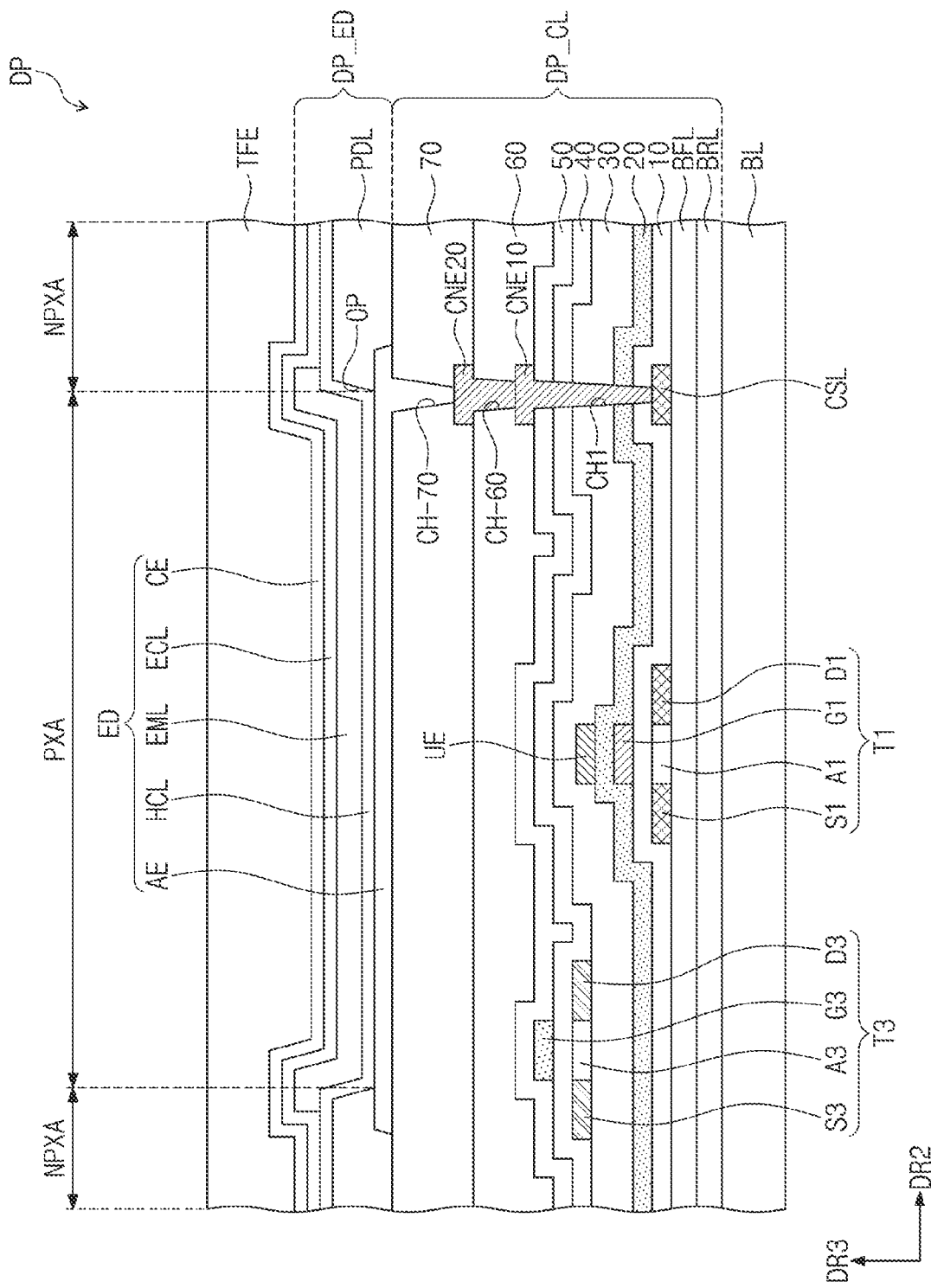
FIG. 12 is a sectional view illustrating a pixel of a display panel according to an embodiment of the inventive concept.
Figure 13A:
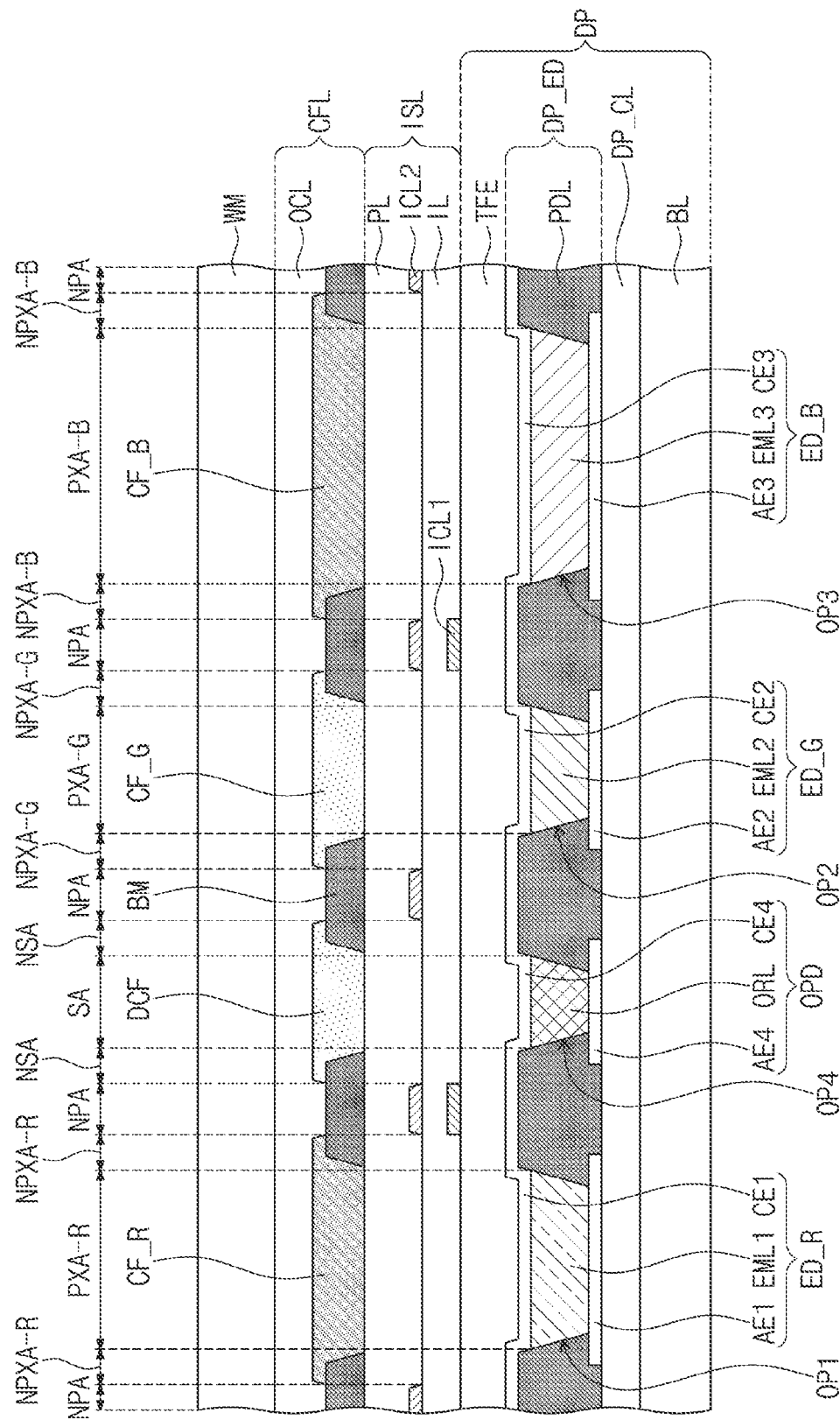
FIGS. 13A and 13B are sectional views illustrating an emission element and a light sensing device, which are provided in a display panel according to an embodiment of the inventive concept.
Figure 13B:
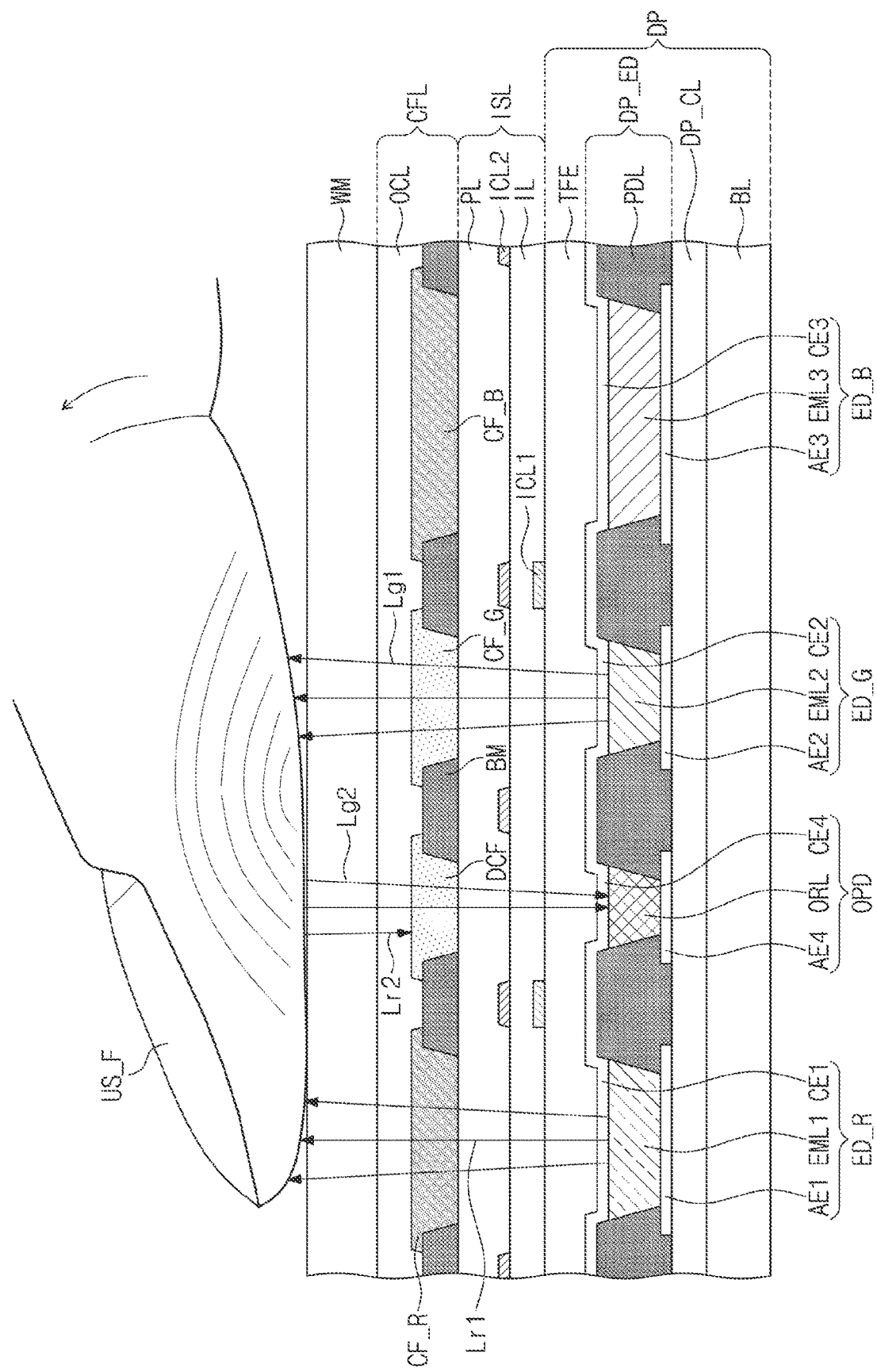

FIG. 12 is a sectional view illustrating a pixel of a display panel according to an embodiment of the inventive concept. FIGS. 13A and 13B are sectional views illustrating an emission element and a light sensing element which are provided in a display panel according to an embodiment of the inventive concept.

Referring to FIGS. 12 and 13A, the display panel DP may include the base layer BL and the circuit layer DP_CL, the display element layer DP_ED, and the encapsulation layer TFE which are disposed on the base layer BL.

The base layer BL may include a synthetic resin layer. The synthetic resin layer may include a thermosetting resin. The synthetic resin layer may be a polyimide-based resin layer, and the inventive concept is not limited to a specific material. The synthetic resin layer may include at least one of acryl resins, methacryl resins, polyisoprene resins, vinyl resins, epoxy resins, urethane resins, cellulose resins, siloxane resins, polyamide resins, or perylene resins. In certain embodiments, the base layer BL may include a glass substrate, a metal substrate, or an organic/inorganic composite substrate.

At least one inorganic layer may be formed on a top surface of the base layer BL. The inorganic layer may be formed of or include at least one of aluminum oxide, titanium oxide, silicon oxide, silicon oxynitride, zirconium oxide, or hafnium oxide. For example, the at least one inorganic layer may include a plurality of inorganic layers, which are provided in a multi-layered structure. The multi-layered inorganic layers may constitute a barrier layer BRL and/or a buffer layer BFL to be described below. In an embodiment, the disposition of the barrier layer BRL and the buffer layer BFL may be optional.

The barrier layer BRL may prevent an external contamination material from entering into the display panel DP. The barrier layer BRL may include a silicon oxide layer and a silicon nitride layer. In an embodiment, the barrier layer BRL may include a plurality of silicon oxide layers and a plurality of silicon nitride layers that are alternately stacked.

The buffer layer BFL may be disposed on the barrier layer BRL. The buffer layer BFL may enhance an adhesion strength between the base layer BL and a semiconductor and/or conductive pattern. The buffer layer BFL may include a silicon oxide layer and a silicon nitride layer. In an embodiment, the buffer layer BFL may include a plurality of silicon oxide layers and a plurality of silicon nitride layers that are alternately stacked.

A semiconductor pattern may be disposed on the buffer layer BFL. Hereinafter, a semiconductor pattern which is directly disposed on the buffer layer BFL will be referred to as a first semiconductor pattern. The first semiconductor pattern may be formed of or include silicon. In an embodiment, the first semiconductor pattern may be formed of or include polysilicon. However, the inventive concept is not limited to this example, and the first semiconductor pattern may be formed of or include amorphous silicon.

FIG. 12 merely illustrates a portion of the first semiconductor pattern, and another portion of the first semiconductor pattern may be further disposed in other regions of the pixel PXij (e.g., see FIG. 5). Electrical characteristics of the first semiconductor pattern may be changed depending on its doping state. In an embodiment, the first semiconductor pattern may include a doped region and an undoped region. The doped region may be doped with n-type dopants or p-type dopants. A p-type transistor may include an impurity region which is doped with p-type dopants and an n-type transistor may include an impurity region that is doped with n-type dopants.

The doped region may have conductivity higher than the undoped region and may be used as an electrode or a signal line. The undoped region may correspond to an active or channel region of a transistor. In other words, a portion of the first semiconductor pattern may be used as the active region of the transistor, another portion may be used as the source or drain electrode of the transistor, and other region may be used as a connection signal line or a connection electrode.

As shown in FIG. 12, the first transistor T1 may include a first electrode S1, a channel portion A1, and a second electrode D1, each of which is a part of the first semiconductor pattern. The first and second electrodes S1 and D1 of the first transistor T1 may extends from the channel portion A1 in two different directions that are opposite to each other.

FIG. 12 illustrates a portion of a connection signal line CSL that is formed of a semiconductor pattern. Although not shown, the connection signal line CSL may be connected to the second electrode of the sixth transistor T6 (e.g., see FIG. 5) when viewed in a plan view.

A first insulating layer 10 may be disposed on the buffer layer BFL. The first insulating layer 10 may be commonly overlapped with the pixels PX (e.g., see FIG. 3) and may be provided to cover the first semiconductor pattern. The first insulating layer 10 may be an inorganic layer and/or an organic layer and may have a single-layered or multi-layered structure. The first insulating layer 10 may be formed of or include at least one of aluminum oxide, titanium oxide, silicon oxide, silicon oxynitride, zirconium oxide, or hafnium oxide. In the present embodiment, the first insulating layer 10 may be a silicon oxide layer having a single-layered structure. The first insulating layer 10 as well as an insulating layer of the circuit layer DP_CL to be described below may be an inorganic layer and/or an organic layer and may have a single-layered or multi-layered structure. The inorganic layer may be formed of or include at least one of the above materials.

A third electrode G1 of the first transistor T1 may be disposed on the first insulating layer 10. The third electrode G1 may be a portion of a metal pattern. The third electrode G1 of the first transistor T1 may be overlapped with the channel portion A1 of the first transistor T1. The third electrode G1 of the first transistor T1 may be used as a self-aligned mask in a process of doping the first semiconductor pattern.

A second insulating layer 20 may be formed on the first insulating layer 10 to cover the third electrode G1. The second insulating layer 20 may be commonly overlapped with the plurality of the pixels PX. The second insulating layer 20 may be an inorganic layer and/or an organic layer and may have a single-layered or multi-layered structure. In the present embodiment, the second insulating layer 20 may be a single silicon oxide layer.

An upper electrode UE may be disposed on the second insulating layer 20. The upper electrode UE may be overlapped with the third electrode G1. The upper electrode UE may be a portion of a metal pattern or a portion of a doped semiconductor pattern. A portion of the third electrode G1 and the upper electrode UE overlapped therewith may constitute the capacitor Cst with the second insulating layer 20 interposed therebetween (e.g., see FIG. 5). In an embodiment, the upper electrode UE may be omitted.

In an embodiment, the second insulating layer 20 may be provided in a form of an insulating pattern. The upper electrode UE may be disposed on the insulating pattern. The upper electrode UE may be used as an etching mask in a process of forming the insulating pattern from the second insulating layer 20.

A third insulating layer 30 may be formed on the second insulating layer 20 to cover the upper electrode UE. In the present embodiment, the third insulating layer 30 may be a single silicon oxide layer. A semiconductor pattern may be disposed on the third insulating layer 30. Hereinafter, the semiconductor pattern which is directly disposed on the third insulating layer 30 will be referred to as a second semiconductor pattern. The second semiconductor pattern may be formed of or include an oxide semiconductor. The oxide semiconductor may include a crystalline or amorphous oxide semiconductor. For example, the oxide semiconductors may include metal oxides whose metallic element is at least one of zinc (Zn), indium (In), gallium (Ga), tin (Sn), or titanium (Ti), or may include mixtures of zinc (Zn), indium (In), gallium (Ga), tin (Sn), or titanium (Ti) and oxides thereof. As an example, the oxide semiconductors may include indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO), or the like.

FIG. 12 merely illustrates a portion of the second semiconductor pattern, and another portion of the second semiconductor pattern may be further disposed in other regions of the pixel PXij (e.g., see FIG. 5). The second semiconductor pattern may include a plurality of regions which are classified depending on whether the metal oxide is reduced. A region (hereinafter, a reduction region) which is formed by reduction of a metal oxide may have higher conductivity than other region (hereinafter, a non-reduction region). The reduction region may be substantially used as an electrode or a signal line. The non-reduction region may correspond to a channel portion of a transistor substantially. In other words, a portion of the second semiconductor pattern may serve as the channel portion of the transistor and another portion of the second semiconductor pattern may serve as the first or second electrode of the transistor.

As shown in FIG. 12, the third transistor T3 may include a first electrode S3, a channel portion A3, and a second electrode D3, each of which is a part of the second semiconductor pattern. The first electrode S3 and the second electrode D3 may include a metallic material that is reduced from a metal oxide semiconductor. The first and second electrodes S3 and D3 may have a specific thickness in the third direction DR3 and may include a metal layer including the reduced metallic material.

A fourth insulating layer 40 may be formed on the third insulating layer 30 to cover the second semiconductor pattern. In the present embodiment, the fourth insulating layer 40 may be a single silicon oxide layer. A third electrode G3 of the third transistor T3 may be disposed on the third insulating layer 30. The third electrode G3 may be a part of a metal pattern. The third electrode G3 of the third transistor T3 may be overlapped with the channel portion A3 of the third transistor T3.

Alternatively, the fourth insulating layer 40 may be replaced with an insulating pattern. The third electrode G3 of the third transistor T3 may be disposed on the insulating pattern. In this case, the third electrode G3 may have the same shape as the insulating pattern, when viewed in a plan view. In the present embodiment, one third electrode G3 is illustrated for convenience in illustration, but the third transistor T3 may be configured to have two third electrodes.

A fifth insulating layer 50 may be formed on the fourth insulating layer 40 to cover the third electrode G3. In the present embodiment, the fifth insulating layer 50 may include a silicon oxide layer and a silicon nitride layer. The fifth insulating layer 50 may include a plurality of silicon oxide layers and a plurality of silicon nitride layers which are alternately stacked.

Although not shown, first and second electrodes of the fourth transistor T4 (e.g., see FIG. 5) may be formed by the same process as the first and second electrodes S3 and D3 of the third transistor T3. In addition, the first and second electrodes of the reset transistor ST1 of the sensor FXij (e.g., see FIG. 5) and the first and second electrodes of the output transistor ST3 (e.g., see FIG. 5) may be formed by the same process as the first and second electrodes S3 and D3 of the third transistor T3.

At least one insulating layer may be further disposed on the fifth insulating layer 50. In the present embodiment, a sixth insulating layer 60 and a seventh insulating layer 70 may be disposed on the fifth insulating layer 50. The sixth insulating layer 60 and the seventh insulating layer 70 may be organic layers and may have a single-layered or multi-layered structure. Each of the sixth and seventh insulating layers 60 and 70 may be a polyimide-based resin layer that is provided in a single-layered structure. However, the inventive concept is not limited to this example, and the sixth insulating layer 60 and the seventh insulating layer 70 may include at least one of acryl resins, methacryl resins, polyisoprene resins, vinyl resins, epoxy resins, urethane resins, cellulose resins, siloxane resins, polyamide resins, or perylene resins.

A first connection electrode CNE10 may be disposed on the fifth insulating layer 50. The first connection electrode CNE10 may be connected to the connection signal line CSL through a first contact hole CH1 form through the first to fifth insulating layers 10 to 50, and a second connection electrode CNE20 may be connected to the first connection electrode CNE10 through a contact hole CH-60 formed through the sixth insulating layer 60. In an embodiment, at least one of the fifth insulating layer 50 and the sixth insulating layer 60 may be omitted.

The display element layer DP_ED may include the emission element ED and a pixel definition layer PDL. An anode AE of the emission element ED may be disposed over the seventh insulating layer 70. The anode AE of the emission element ED may be connected to the second connection electrode CNE20 through a contact hole CH-70 formed through the seventh insulating layer 70.

The pixel definition layer PDL which include an opening may be disposed on the seventh insulating layer 70. An opening OP of the pixel definition layer PDL may expose at least a portion of the anode AE of the emission element ED. The opening OP of the pixel definition layer PDL may define an emission region PXA. For example, the pixels PX (e.g., see FIG. 3) may be regularly arranged on the plane of the display panel DP (e.g., see FIG. 3). A region in which the pixels PX are disposed may be defined as a pixel region, and each pixel region may include the emission region PXA and a non-emission region NPXA adjacent to the emission region PXA. The non-emission region NPXA may enclose the emission region PXA.

A hole control layer HCL may be disposed in common in the emission region PXA and the non-emission region NPXA. The common layer, such as the hole control layer HCL, may be commonly provided in a plurality of the pixels PX. The hole control layer HCL may include a hole transport layer and a hole injection layer.

An emission layer EML may be disposed on the hole control layer HCL. The emission layer EML may be locally provided on only a region corresponding to the opening OP. For example, the emission layer EML may include a plurality of patterns that are formed in the plurality of pixels PX, respectively.

In the present embodiment, the emission layer EML is illustrated to have a patterned structure, but in an embodiment, the emission layer EML may be provided in common in the plurality of pixels PX. Here, the emission layer EML may generate a white light or a blue light. In addition, the emission layer EML may have a multi-layered structure.

An electron control layer ECL may be disposed on the emission layer EML. The electron control layer ECL may include an electron transport layer and an electron injection layer. A cathode CE of the emission element ED may be disposed on the electron control layer ECL. The electron control layer ECL and the cathode CE may be commonly provided in a plurality of the pixels PX.

The encapsulation layer TFE may be disposed on the cathode CE. The encapsulation layer TFE may cover the pixels PX. In the present embodiment, the encapsulation layer TFE may be provided to directly cover the cathode CE. In an embodiment, the display panel DP may further include a capping layer directly covering the cathode CE. In an embodiment, the emission element ED may have an inverted stacking structure (e.g., an upside-down structure of FIG. 12).

Referring to FIGS. 13A and 13B, a first electrode layer may be disposed on the circuit layer DP_CL. The pixel definition layer PDL may be formed on the first electrode layer. The first electrode layer may include first to third anodes AE1, AE2, and AE3. The pixel definition layer PDL may have first to third openings OP1, OP2, and OP3 which are formed to at least partially expose the first to third anode AE1, AE2, and AE3, respectively. In an embodiment, the pixel definition layer PDL may further include a black material. For example, the pixel definition layer PDL may further include a black organic dye/pigment such as carbon black or aniline black. The pixel definition layer PDL may be a layer that is formed by mixing blue and black organic materials with each other. The pixel definition layer PDL may further include an organic material having a liquid-repellent property.

As shown in FIG. 13A, the display panel DP may include first to third emission regions PXA-R, PXA-G, and PXA-B and first to third non-emission regions NPXA-G, NPXA-B, and NPXA-R which are disposed adjacent to the first to third emission regions PXA-R, PXA-G, and PXA-B. Each of the non-emission regions NPXA-R, NPXA-G, and NPXA-B may enclose a corresponding one of the emission regions PXA-R, PXA-G, and PXA-B. In the present embodiment, the first emission region PXA-R may be defined in a region corresponding to a portion of the first anode electrode AE1 exposed by the first opening OP1. The second emission region PXA-G may be defined in a region corresponding to a portion of the second anode electrode AE2 exposed by the second opening OP2. The third emission region PXA-B may be defined in a region corresponding to a portion of the third anode electrode AE3 exposed by the third opening OP3. A non-pixel regions NPA may be defined between the first to third non-emission regions NPXA-R, NPXA-G, and NPXA-B.

An emission layer may be disposed on the first electrode layer. The emission layer may include first to third emission layers EML1, EML2, and EML3. The first to third emission layers EML1, EML2, and EML3 may be disposed in respective regions corresponding to the first to third openings OP1, OP2, and OP3. The first to third emission layers EML1, EML2, and EML3 may be isolated patterns which are respectively formed in the first to third pixels PX-R, PX-G, and PX-B (e.g., see FIG. 4A). Each of the first to third emission layers EML1, EML2, and EML3 may be formed of or include at least one of organic or inorganic materials. Each of the first to third emission layers EML1-EML3 may be configured to generate a color light of specific color. For example, the first emission layer EML1 may generate a red light, the second emission layer EML2 may generate a green light, and the third emission layer EML3 may generate a blue light.

In the present embodiment, the first to third emission layers EML1, EML2, and EML3 are illustrated to have a patterned structure, but in an embodiment, a single emission layer may be commonly disposed in the first to third emission regions PXA-R, PXA-G, and PXA-B. Here, the emission layer may generate a white light or a blue light. In addition, the emission layer may have a multi-layered structure called 'tandem'.

Each of the first to third emission layers EML1, EML2, and EML3 may include a low-molecular organic material or a high-molecular organic material which is used as its light-emitting material. Alternatively, each of the first to third emission layers EML1, EML2, and EML3 may include a quantum-dot material which is used as its light-emitting material. The core of the quantum dot may be selected from the group consisting of II-VI compounds, III-V compounds, IV-VI compounds, IV elements, IV compounds, and combination thereof.

A second electrode layer may be disposed on the emission layer. The second electrode layer may include first to third cathodes CE1, CE2, and CE3. The first to third cathodes CE1, CE2, and CE3 may be electrically connected to each other. In an embodiment, the first to third cathodes CE1, CE2, and CE3 may be provided in the form of a single object. In this case, the first to third cathodes CE1, CE2, and CE3 may be commonly disposed in the first to third emission regions PXA-R, PXA-G, and PXA-B, the first to third non-emission regions NPXA-R, NPXA-G, and NPXA-B, and the non-pixel region NPA.

The display element layer DP_ED may further include light sensing elements OPD. Each of the light sensing elements OPD may be a photodiode. The pixel definition layer PDL may further include a fourth opening OP4 which is provided to correspond to the light sensing elements OPD.

Each of the light sensing elements OPD may include a fourth anode AE4, a photoelectric conversion layer ORL, and a fourth cathode CE4. The fourth anode AE4 may be disposed on the same layer as the first electrode layer. For example, the fourth anode AE4 may be disposed on the circuit layer DP_CL and the first to fourth anodes AE to AE4 may be formed at the same time by the same process.

The fourth opening OP4 of the pixel definition layer PDL may expose at least a portion of the fourth anode AE4. The photoelectric conversion layer ORL may be disposed on the fourth anode AE4 exposed by the fourth opening OP4. The photoelectric conversion layer ORL may be formed of or include an organic photo-sensing material. The fourth cathode CE4 may be disposed on the photoelectric conversion layer ORL. In an embodiment, the fourth cathode CE4 and the first to third cathodes CE1 to CE3 may be formed by the same process and at the same time. In an embodiment, the fourth cathode CE4 and the first to third cathodes CE1 to CE3 may be provided in the form of a single object.

Each of the fourth anode and fourth cathodes AE4 and CE4 may receive an electrical signal. The fourth cathode CE4 and the fourth anode AE4 may receive different signals from each other. Thus, an electric field may be produced between the fourth anode AE4 and the fourth cathode CE4. The photoelectric conversion layer ORL may generate an electrical signal corresponding to light incident into the sensor. The photoelectric conversion layer ORL may absorb an energy of the incident light to generate electric charges. For example, the photoelectric conversion layer ORL may be formed of or include a photo-sensitive semiconductor material.

Electric charges generated in the photoelectric conversion layer ORL may change the electric field between the fourth anode AE4 and the fourth cathode CE4. An amount of electric charges generated in the photoelectric conversion layer ORL may depend on whether light is incident into the light sensing elements OPD or on an amount or intensity of light incident into the light sensing elements OPD. Thus, the electric field between the fourth anode AE4 and the fourth cathode CE4 may also be changed depending on the amount or the intensity of the incident light. In an embodiment, the light sensing elements OPD may be configured to obtain information on a user's fingerprint from a change of the electric field between the fourth anode AE4 and the fourth cathode CE4.

However, the inventive concept is not limited to this example, and in an embodiment, each of the light sensing elements OPD may include a photo-transistor in which the photoelectric conversion layer ORL is used as its active layer. Here, each of the light sensing elements OPD may sense an amount of a current passing through the phototransistor to obtain fingerprint information. In an embodiment, each of the light sensing elements OPD may include various photoelectric conversion devices which can generate an electrical signal based on a change in the light amount, but the inventive concept is not limited to a specific embodiment.

The encapsulation layer TFE may be disposed on the display element layer DP_ED. The encapsulation layer TFE may include at least one inorganic layer or at least one organic layer. In an embodiment, the encapsulation layer TFE may include two inorganic layers and an organic layer interposed therebetween. In an embodiment, the encapsulation layer TFE may include a plurality of inorganic layers and a plurality of organic layers which are alternately stacked.

The inorganic encapsulation layer may be used to protect the emission element ED from moisture or oxygen, and the organic encapsulation layer may be used to protect the emission element ED from a contaminants such as dust particles. The inorganic encapsulation layer may include a silicon nitride layer, a silicon oxynitride layer, a silicon oxide layer, a titanium oxide layer, or an aluminum oxide layer, but the inventive concept is not limited thereto. The organic encapsulation layer may include an acrylic organic layer, but the inventive concept is not limited thereto.

The display device DD may include the input-sensing layer ISL disposed on the display panel DP and the color filter layer CFL disposed on the input-sensing layer ISL.

The input-sensing layer ISL may be directly disposed on the encapsulation layer TFE. The input-sensing layer ISL may include a first conductive layer ICL1, an insulating layer IL, a second conductive layer ICL2, and a protection layer PL. The first conductive layer ICL1 may be disposed on the encapsulation layer TFE. FIGS. 13A and 13B illustrate an example in which the first conductive layer ICL1 is directly disposed on the encapsulation layer TFE, but the inventive concept is not limited to this example. The input-sensing layer ISL may further include a base insulating layer which is disposed between the first conductive layer ICL1 and the encapsulation layer TFE. In this case, the encapsulation layer TFE may be covered with the base insulating layer and the first conductive layer ICL1 may be disposed on the base insulating layer. In an embodiment, the base insulating layer may be formed of or include an inorganic insulating material.

The insulating layer IL may cover the first conductive layer ICL1. The second conductive layer ICL2 may be disposed on the insulating layer IL. The input-sensing layer ISL is illustrated to include the first and second conductive layers ICL1 and ICL2, but the inventive concept is not limited to this example. For example, the input-sensing layer ISL may include only one of the first and second conductive layers ICL1 and ICL2.

The protection layer PL may be disposed on the second conductive layer ICL2. The protection layer PL may be formed of or include an organic insulating material. The protection layer PL may protect the first and second conductive layers ICL1 and ICL2 from moisture or oxygen and may protect first and second conductive layers ICL1 and ICL2 from a contaminants.

The color filter layer CFL may be disposed on the input-sensing layer ISL. The color filter layer CFL may be directly disposed on the protection layer PL. The color filter layer CFL may include a first color filter CF_R, a second color filter CF_G, and a third color filter CF_B. The first color filter CF_R may have a first color, the second color filter CF_G may have a second color, and the third color filter CF_B may have a third color. In an embodiment, the first color may be red, the second color may be green, and the third color may be blue.

The color filter layer CFL may further include a dummy color filter DCF. If a region provided with the photoelectric conversion layer ORL is defined as a sensing region SA and a region around the sensing region SA is defined as a non-sensing region NSA, the dummy color filter DCF may be disposed in a region corresponding to the sensing region SA. The dummy color filter DCF may be overlapped with the sensing region SA and the non-sensing region NSA adjacent to the sensing region SA. In an embodiment, the dummy color filter DCF may have the same color as one of the first to third color filters CF_R, CF_G, and CF_B. In an embodiment, the dummy color filter DCF may have the same color (i.e., green) as the second color filter CF_G.

The color filter layer CFL may further include a black matrix BM. The black matrix BM may be disposed to correspond to the non-pixel region NPA. The black matrix BM may be disposed to be overlapped with the first and second conductive layers ICL1 and ICL2 in the non-pixel region NPA. In an embodiment, the black matrix BM may be overlapped with the non-pixel region NPA, the first to third non-emission regions NPXA-R, NPXA-G, and NPXA-B. The black matrix BM may not be overlapped with the first to third emission regions PXA-R, PXR-G, and PXA-B.

The color filter layer CFL may further include an over-coating layer OCL. The over-coating layer OCL may be formed of or include an organic insulating material. The over-coating layer OCL may be provided to have a thickness that is large enough to fill a recessed region between the first to third color filters CF_R, CF_G, and CF_B. The over-coating layer OCL is not limited to a specific material if a top surface of the color filter layer CFL is planarized by the over-coating layer OCL when the over-coating layer OCL is formed to a specific thickness. For example, the over-coating layer OCL may be formed of or include at least one of acrylate-based organic materials.

Referring to FIG. 13B, each of the first to third emission elements ED_R, ED-G, and ED_B may emit light, during an operation of the display device DD (e.g., see FIG. 1). The first emission elements ED_R may output a first light Lr1, the second emission elements ED_G may output a second light Lg1, and the third emission elements ED_B may output a third light. Here, the first light Lr1 may be light within a red wavelength range, the second light Lg1 may be light within a green wavelength range, and the third light may be light within a blue wavelength range.

In an embodiment, each of the light sensing elements OPD may receive light emitted from particular emission elements (e.g., the second emission elements ED_G) of the first to third emission elements ED_R, ED-G and ED_B. In other words, each of the light sensing elements OPD may receive a part of the second light Lg1 (hereinafter, a second reflection light Lg2) which is output from the second emission elements ED_G and is reflected by a user's fingerprint. The second light Lg1 and the second reflection light Lg2 may be light within a green wavelength range. The dummy color filter DCF may be disposed on the light sensing elements OPD. The dummy color filter DCF may be green color filter. Thus, the second reflection light Lg2 may pass through the dummy color filter DCF and then may be incident into the light sensing elements OPD.

Meanwhile, the first and third lights, which are output from the first and third emission elements ED_R and ED_B, may also be reflected by the user's hand US_F. For example, a part of the first light Lr1 (hereinafter, a first reflection light Lr2) which is output from the first emission elements ED_R and is reflected by the user's hand US_F, may not pass through the dummy color filter DCF and may be absorbed into the dummy color filter DCF. Thus, the first reflection light Lr2 may not be incident into the light sensing elements OPD because it does not pass through the dummy color filter DCF. Similarly, the third light may be absorbed by the dummy color filter DCF, even when it is reflected by the user's hand US_F. Thus, only the second reflection light Lg2 may be provided to the light sensing elements OPD.

According to an embodiment of the inventive concept, a display panel may include a pixel and a sensor, and the sensor may be driven using an initializing scan signal and a compensating scan signal which are provided to operate the pixel. In particular, the initializing and compensating scan signals which are provided to third and fourth transistors of the pixel may be provided to reset and output transistors of the sensor. Thus, it is unnecessary to prepare an additional signal line or an additional circuit for driving the sensor, and moreover, it may be possible to avoid a reduction in opening ratio of a display device even when the sensor is disposed in a display panel.

While example embodiments of the inventive concept have been particularly shown and described, it will be understood by one of ordinary skill in the art that variations in form and detail may be made therein without departing from the spirit and scope of the attached claims.

What is claimed is:

1. A display device, comprising:
a plurality of pixels, each of which includes an emission element and a pixel driving circuit connected to the emission element, the pixel driving circuit controlling an operation of the emission element in response to a first scan signal and a second scan signal; and
a plurality of sensors, each of which includes a light sensing element and a sensor driving circuit connected the light sensing element, the sensor driving circuit outputting a sensing signal in response to the first scan signal and the second scan signal,
wherein the sensor driving circuit comprises:
a reset transistor including a first electrode receiving a reset voltage, a second electrode connected to a first sensing node, and a third electrode receiving the first scan signal;
an amplifying transistor including a first electrode receiving a first driving voltage, a second electrode connected to a second sensing node, and a third electrode connected to the first sensing node; and
an output transistor including a first electrode connected to the second sensing node, a second electrode connected to a readout line, and a third electrode receiving the second scan signal.

2. The display device of claim 1, wherein the pixel driving circuit comprises:
a first transistor which is connected between a first driving voltage line receiving the first driving voltage and the emission element;
a second transistor which is connected between a data line and a first electrode of the first transistor and receives a third scan signal;
a third transistor which is connected between a second electrode of the first transistor and a first node and receives the first scan signal; and
a fourth transistor which is connected between the first node and an initializing line and receives the second scan signal, and
wherein the third transistor and the fourth transistor are transistors of a different type from the first transistor and the second transistor.

3. The display device of claim 2, wherein the reset transistor and the output transistor are transistors of the same type as the third transistor and the fourth transistor.

4. The display device of claim 3, wherein the third transistor and the fourth transistor, the reset transistor, and the output transistor are NMOS transistors, and the first transistor and the second transistor are PMOS transistors.

5. The display device of claim 3, wherein the third transistor and the fourth transistor, the reset transistor, and the output transistor are oxide semiconductor transistors, and the first transistor and the second transistor are transistors including silicon.

6. The display device of claim 2, wherein the amplifying transistor has a different type from the third transistor and the fourth transistor.

7. The display device of claim 6, wherein the reset voltage has a voltage level corresponding to an activation period of the third scan signal.

8. The display device of claim 2, wherein the amplifying transistor has a same type as the third transistor and the fourth transistor.

9. The display device of claim 8, wherein the control scan signal comprises a first control period which is overlapped with an activation period of the second scan signal and a second control period which is overlapped with an activation period of the first scan signal.

10. The display device of claim 9, wherein the control scan signal comprises a first control period, which is overlapped with an activation period of the second scan signal, and a second control period, which is overlapped with an activation period of the first scan signal.

11. The display device of claim 10, wherein the reset voltage has a voltage level corresponding to an activation period of the third scan signal.

12. The display device of claim 2, wherein a cathode of the emission element and a cathode of the light sensing element are electrically connected to a second driving voltage line receiving a second driving voltage.

13. The display device of claim 2, wherein the pixel driving circuit further comprises:
a first emission control transistor which is connected between the first driving voltage line and the first electrode of the first transistor; and
a second emission control transistor which is connected between the second electrode of the first transistor and an anode of the emission element.

14. The display device of claim 13, wherein each of the first emission control transistor and the second emission control transistor receives an emission control signal, and an inactivation period of the emission control signal is overlapped with an activation period of each of the first scan signal, the second scan signal, and the third scan signal.

15. The display device of claim 1, wherein an anode of the light sensing element is electrically connected to the first sensing node.

16. The display device of claim 1, further comprising:
a base layer;
a circuit layer which is disposed on the base layer, and in which the pixel driving circuit and the sensor driving circuit are disposed; and a display element layer which is disposed on the circuit layer, and in which the emission element and the light sensing element are disposed.

17. The display device of claim 16, wherein the emission element is an organic light emitting diode and the light sensing element is an organic photodiode.

18. A display device, comprising:
a plurality of pixels, each of which includes an emission element and a pixel driving circuit connected to the emission element, the pixel driving circuit controlling an operation of the emission element; and
a plurality of sensors, each of which includes a light sensing element and a sensor driving circuit connected to the light sensing element, the sensor driving circuit outputting a sensing signal,
wherein the pixel driving circuit comprises:
a first transistor which is connected between the emission element and a first driving voltage line receiving a first driving voltage;
a second transistor which is connected between a data line and a first electrode of the first transistor and receives a third scan signal;
a third transistor which is connected between a second electrode of the first transistor and a first node and receives a first scan signal; and
a fourth transistor which is connected between the first node and an initializing line and receives a second scan signal, and
wherein the sensor driving circuit comprises:
a reset transistor including a first electrode receiving the third scan signal, a second electrode connected to a first sensing node, and a third electrode receiving the first scan signal;
an amplifying transistor including a first electrode connected to the first driving voltage line, a second electrode connected to a second sensing node, and a third electrode connected to the first sensing node; and
an output transistor including a first electrode connected to the second sensing node, a second electrode connected to a sensing line, and a third electrode receiving the second scan signal.

19. The display device of claim 18, wherein the third transistor and the fourth transistor are transistors of a different type from the first transistor and the second transistor, and the reset transistor and the output transistor are transistors of the same type as the third and fourth transistors.

20. The display device of claim 19, wherein the third transistor and the fourth transistor, the reset transistor, and the output transistor are NMOS transistors, and the first transistor and the second transistor are PMOS transistors.

21. The display device of claim 19, wherein the third transistor and the fourth transistor, the reset transistor, and the output transistor are oxide semiconductor transistors, and the first transistor and the second transistor are transistors including silicon.

22. The display device of claim 19, wherein the amplifying transistor has a same type as the first transistor and the second transistor.

23. The display device of claim 18, wherein a cathode of the emission element and a cathode of the light sensing element are electrically connected to a second driving voltage line receiving a second driving voltage.

24. The display device of claim 18, wherein the pixel driving circuit further comprises:
a first emission control transistor which is connected between the first driving voltage line and the first electrode of the first transistor; and
a second emission control transistor which is connected between the second electrode of the first transistor and an anode of the emission element.

25. The display device of claim 24, wherein each of the first emission control transistor and the second emission control transistor receives an emission control signal, and an inactivation period of the emission control signal is overlapped with an activation period of each of the first scan signal, the second scan signal, and third scan signals.

26. The display device of claim 18, wherein an anode of the light sensing element is electrically connected to the first sensing node.

27. The display device of claim 18, further comprising:
a base layer;
a circuit layer which is disposed on the base layer, and in which the pixel driving circuit and the sensor driving circuit are disposed; and
a display element layer which is disposed on the circuit layer, and in which the emission element and the light sensing element are disposed.

28. The display device of claim 27, wherein the emission element is an organic light emitting diode and the light sensing element is an organic photodiode.

* * * * *